(12) United States Patent     (10) Patent No.:     US 7,446,450 B2
Boland et al.                  (45) Date of Patent:    Nov. 4, 2008

(54) METHOD AND SYSTEM USING LIQUID DIELECTRIC FOR ELECTROSTATIC POWER GENERATION

(75) Inventors: Justin Scott Boland, Altadena, CA (US); Yu-Chong Tai, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 185 days.

(21) Appl. No.: 11/146,938

(22) Filed: Jun. 6, 2005

(65) Prior Publication Data
US 2006/0077762 A1    Apr. 13, 2006

Related U.S. Application Data

(60) Provisional application No. 60/577,904, filed on Jun. 7, 2004, provisional application No. 60/578,117, filed on Jun. 7, 2004, provisional application No. 60/577,864, filed on Jun. 7, 2004.

(51) Int. Cl.
G21D 7/02    (2006.01)
H02K 44/00   (2006.01)
H02N 1/00    (2006.01)
F02B 63/04   (2006.01)

(52) U.S. Cl. .......................... 310/309; 290/1 R; 310/11
(58) Field of Classification Search ................. 290/1 R; 310/309, 308, 310, 11; 322/4
See application file for complete search history.

(56) References Cited

U.S. PATENT DOCUMENTS

| 1,905,627 A * | 4/1933 | Holland ........................ 204/278 |
| 1,980,873 A * | 11/1934 | Niederreither ............... 204/266 |
| 3,167,666 A * | 1/1965 | Janner et al. ................. 310/309 |
| 3,563,245 A | 2/1971 | McLean |
| 3,578,998 A * | 5/1971 | Euerle .......................... 310/11 |
| 4,206,396 A * | 6/1980 | Marks ......................... 322/2 A |
| 4,797,566 A * | 1/1989 | Nozaki et al. ................. 307/43 |
| 6,215,221 B1 * | 4/2001 | Cabuz et al. ................. 310/309 |

(Continued)

FOREIGN PATENT DOCUMENTS

JP    05130784 A * 5/1993

OTHER PUBLICATIONS

International Search Report PCT/US05/20096.

*Primary Examiner*—Julio Gonzalez
(74) *Attorney, Agent, or Firm*—Townsend and Townsend and Crew LLP

(57) ABSTRACT

A system and method for generating power. The system has a first electrode member comprising a first region and a second electrode member comprising a second region. Preferably, the second electrode member is coupled to the first electrode member. An electret is coupled between the first electrode member and the second electrode member. The system has a spatial region provided between the first region of the first electrode member and the second region of the second electrode member. A volume of fluid (e.g., liquid, liquid and solids, gas and liquid, solids and gases) is provided between the first region and the second region and is adapted to move between the first region and the second region to cause a change in an electric field characteristic within a portion of the spatial region by the movement of at least a portion of the fluid within the portion of the spatial region to generate a change in voltage potential between the first electrode and the second electrode.

79 Claims, 27 Drawing Sheets

LEPG conceptual image.

U.S. PATENT DOCUMENTS

| | | | |
|---|---|---|---|
| 6,407,649 B1 * | 6/2002 | Tikka et al. | 333/133 |
| 6,621,191 B1 * | 9/2003 | Nomura et al. | 310/309 |
| 7,109,597 B1 * | 9/2006 | Bose | 290/43 |
| 7,166,927 B2 * | 1/2007 | Koslover et al. | 290/1 R |
| 2003/0178913 A1 * | 9/2003 | Norimatsu | 310/309 |

* cited by examiner

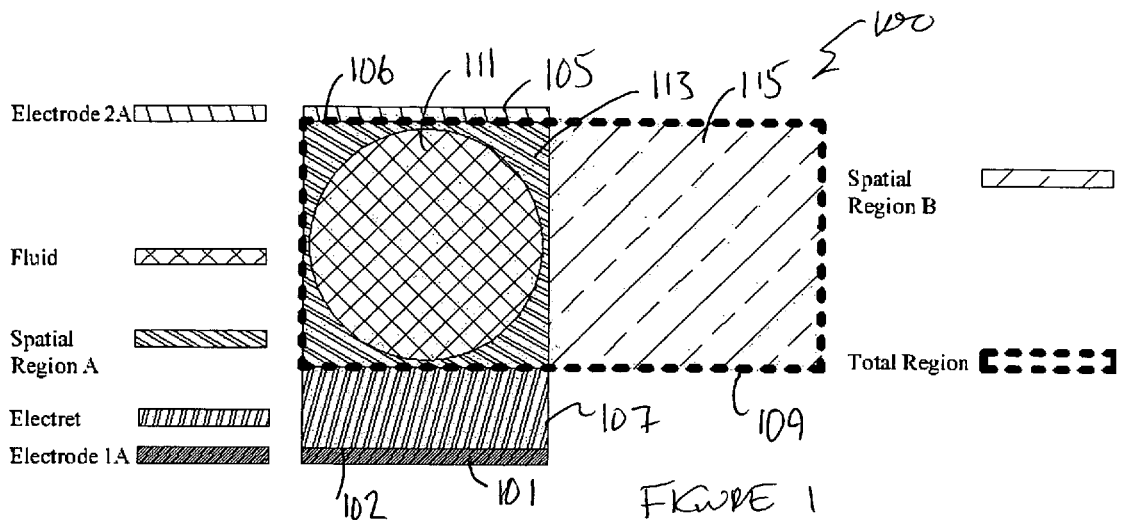

The device is on the left, and the fluid can move through Regions A and B, which is the same as saying it can move though the Total Region.

FIGURE 1

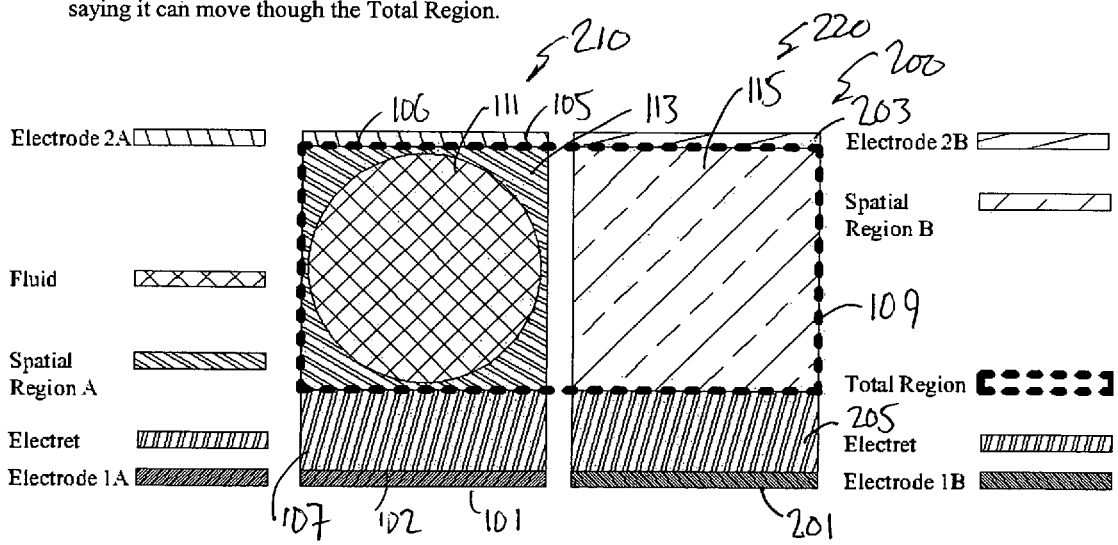

Device A and device B are coupled through the Total Region, so that the fluid moves within the Total Region. When fluid is moving out of Region A, it is moving into Region B or the small Region that is part of the Total Region but not part of A or B.

FIGURE 2

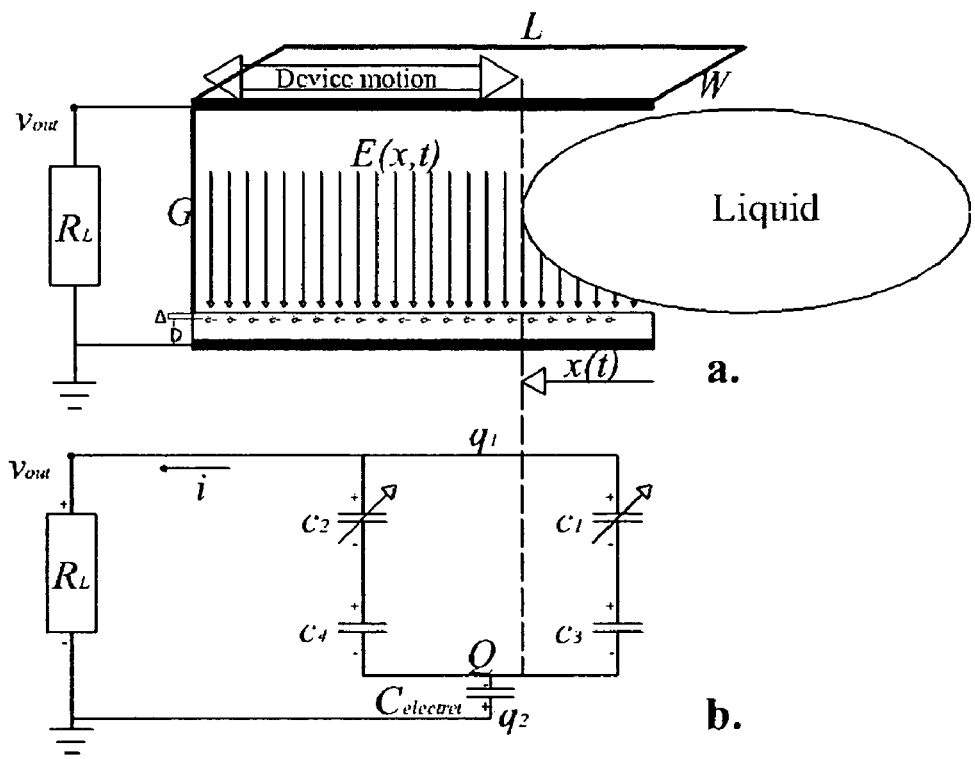
Figure 6. a. Conceptual design b. Equivalent circuit.
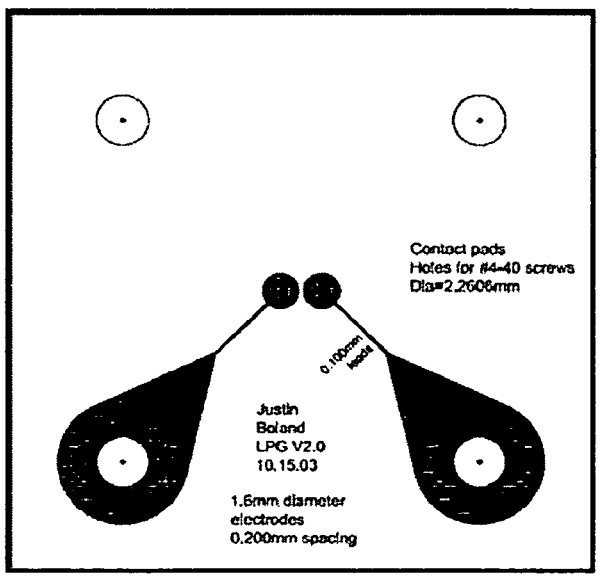
Figure 7. Process Flow a. deposit metal on glass substrate b. pattern metal c. spin-on Teflon AF d. mask design used in step b.

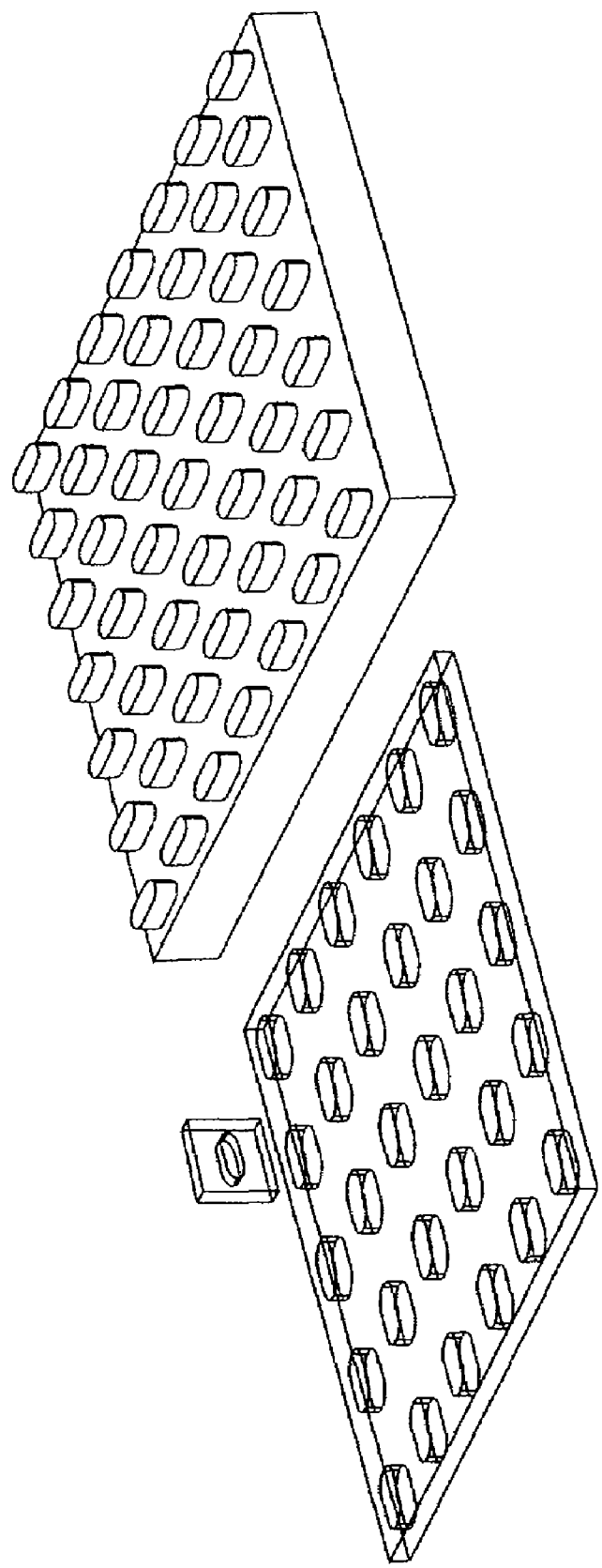
FIGURE 8. Mold Master for Sylgard 184 and peeled PDMS

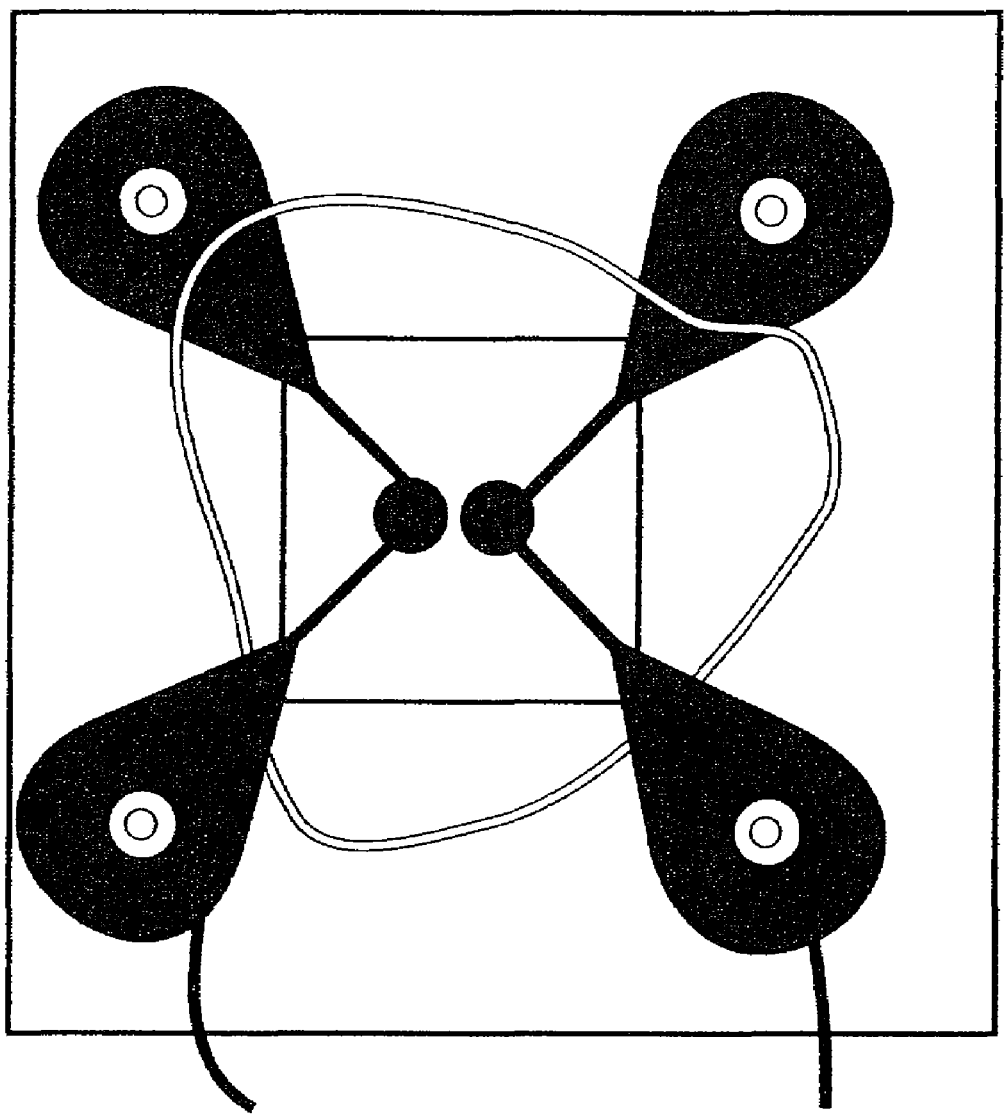
FIGURE 9. Assembled LPG Devices 3

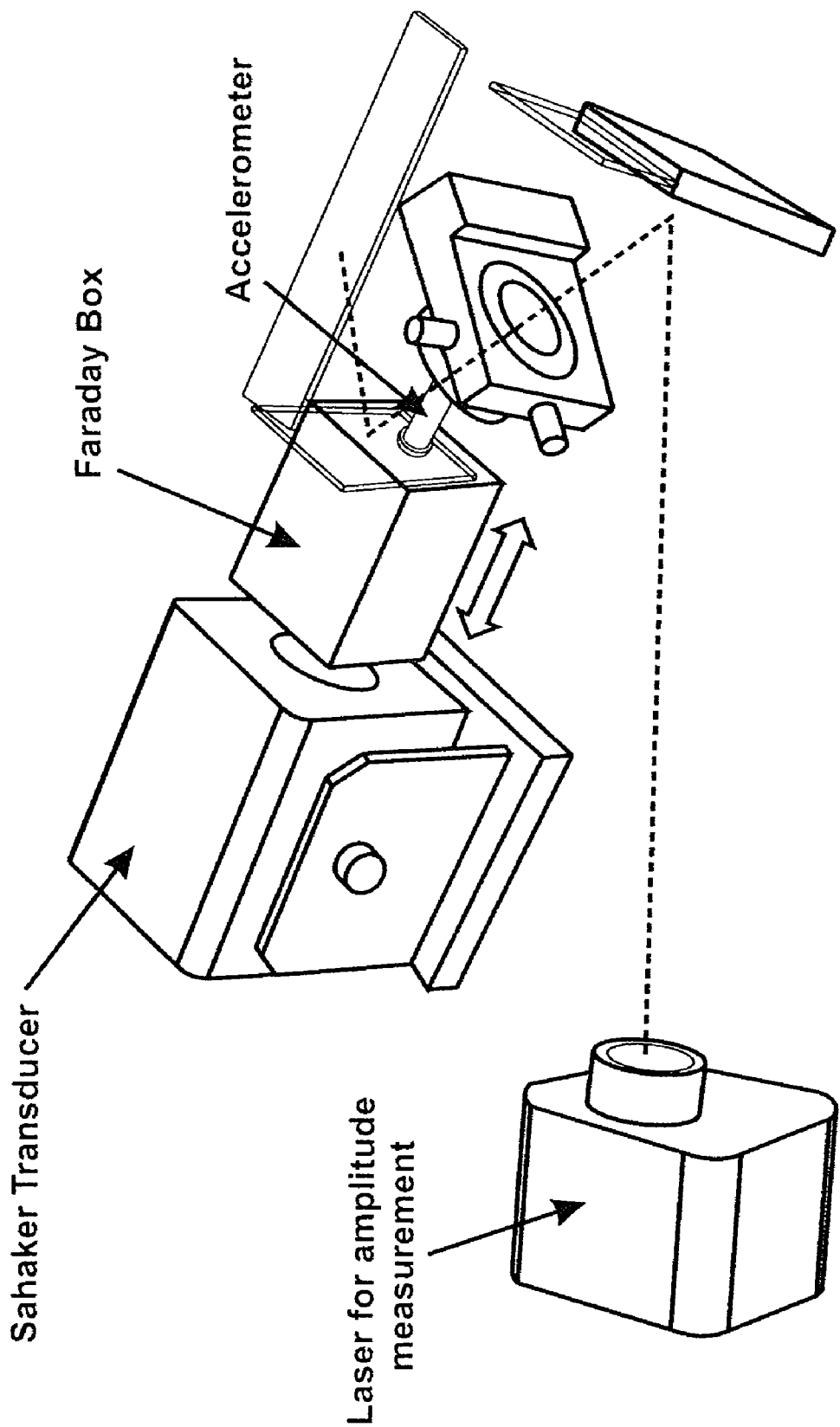
FIGURE 10. Test Setup for LEPG.

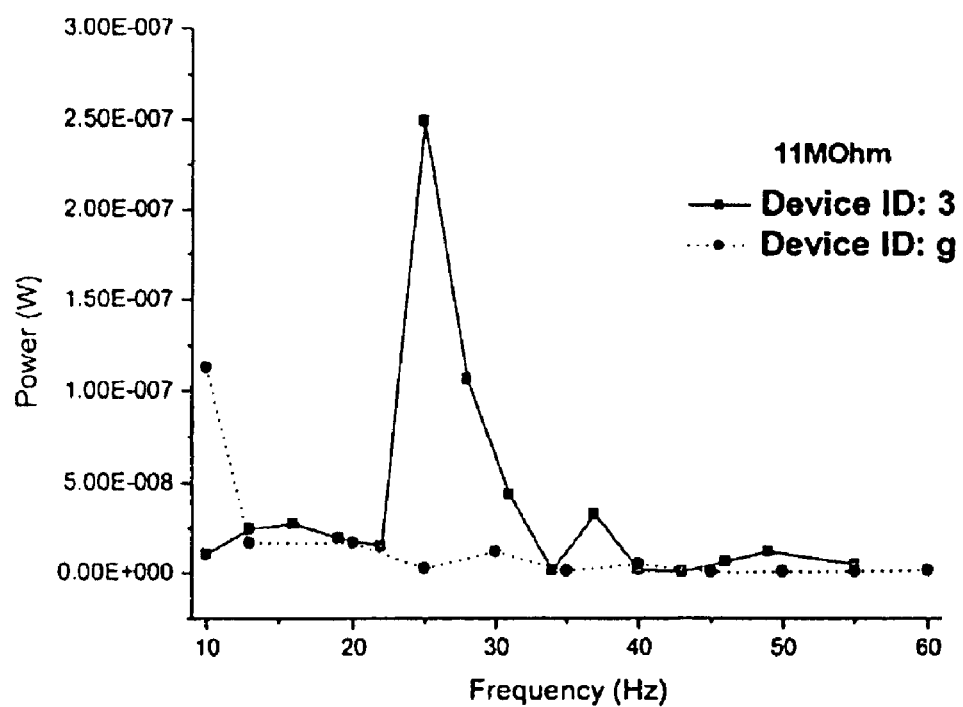
Figure 11. Power versus frequency for 2 devices of different channel length and height.

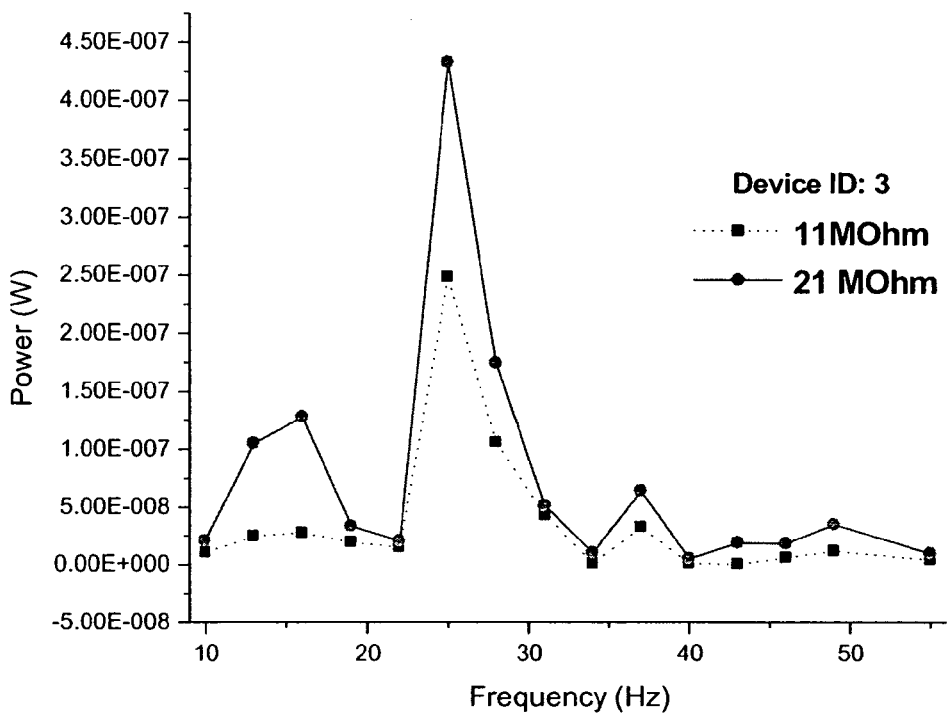
Figure 12. Power versus frequency for a single device with 2 different loads.
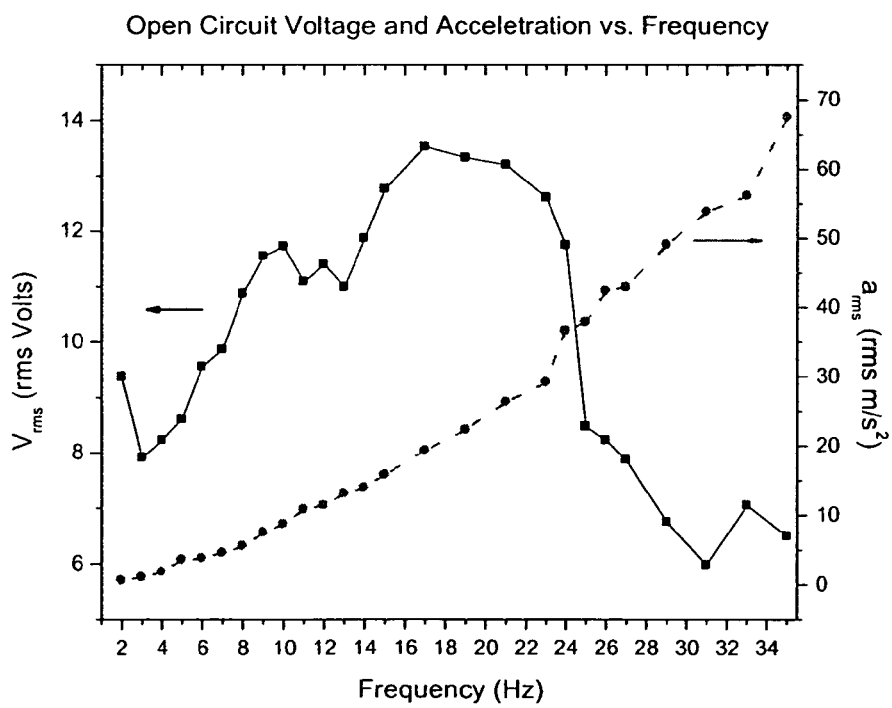
Figure 13. Open circuit voltage and acceleration versus frequency for constant displacement.

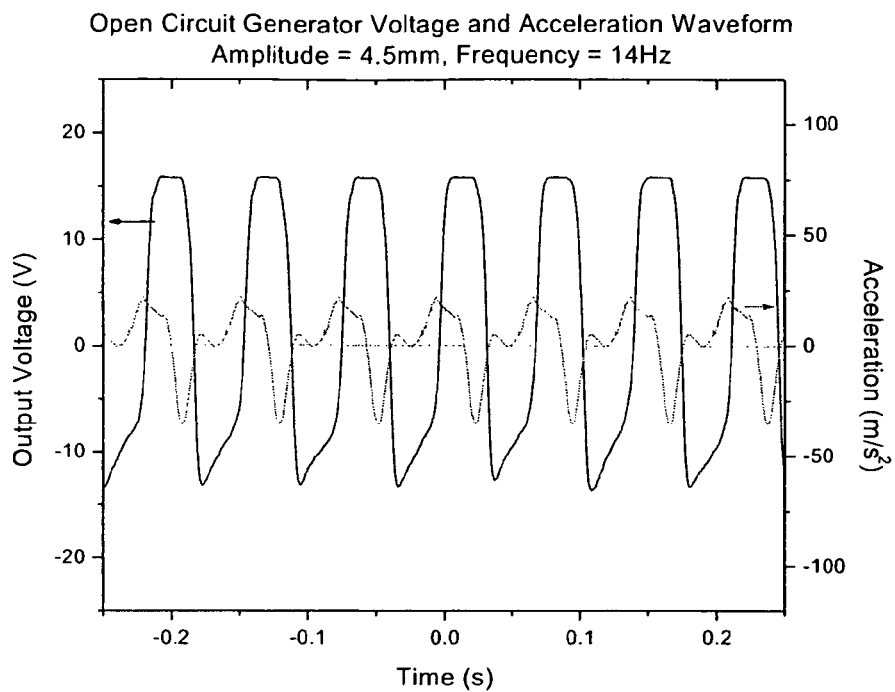
Figure 14. Open circuit voltage and acceleration waveforms, at given amplitude and frequency.
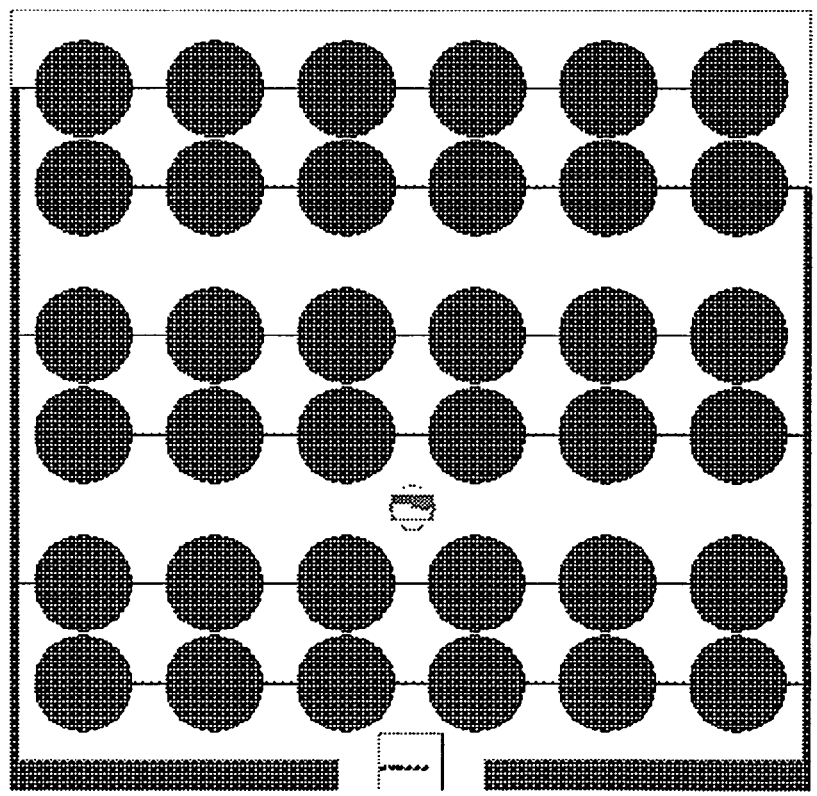
Figure 15

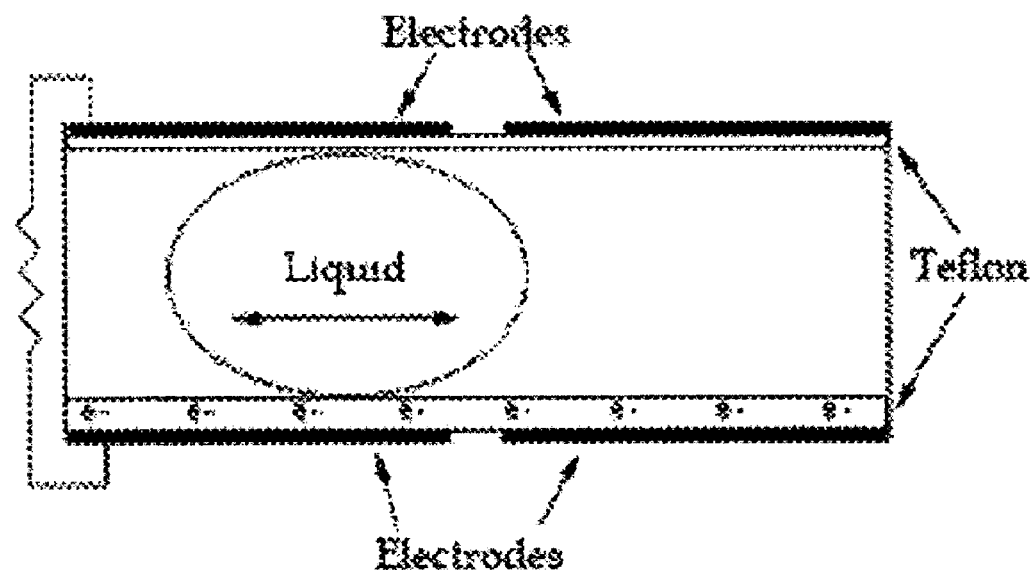
Figure 16. LEPG conceptual image.
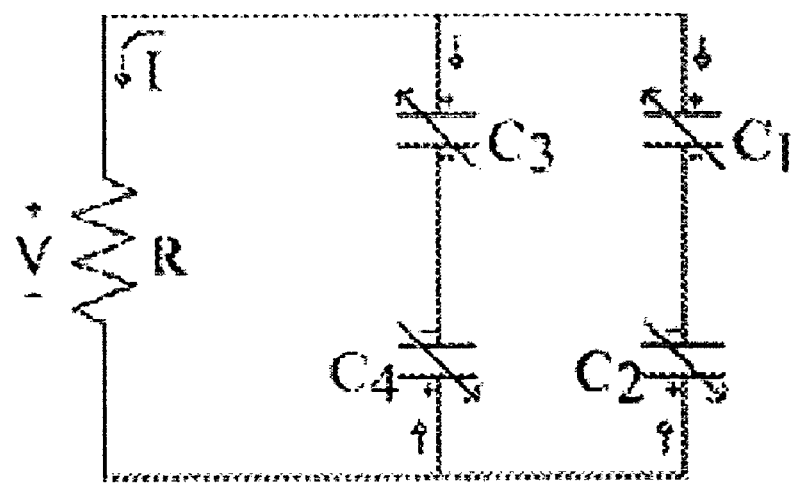
Figure 17. LEPG conceptual image.

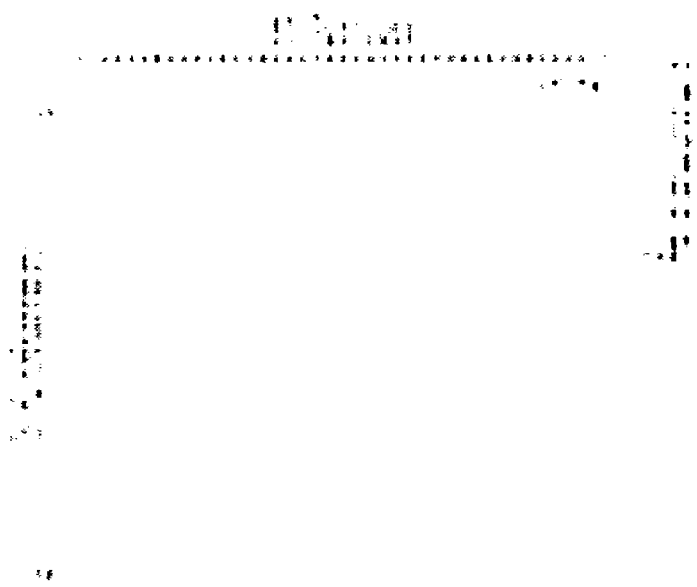
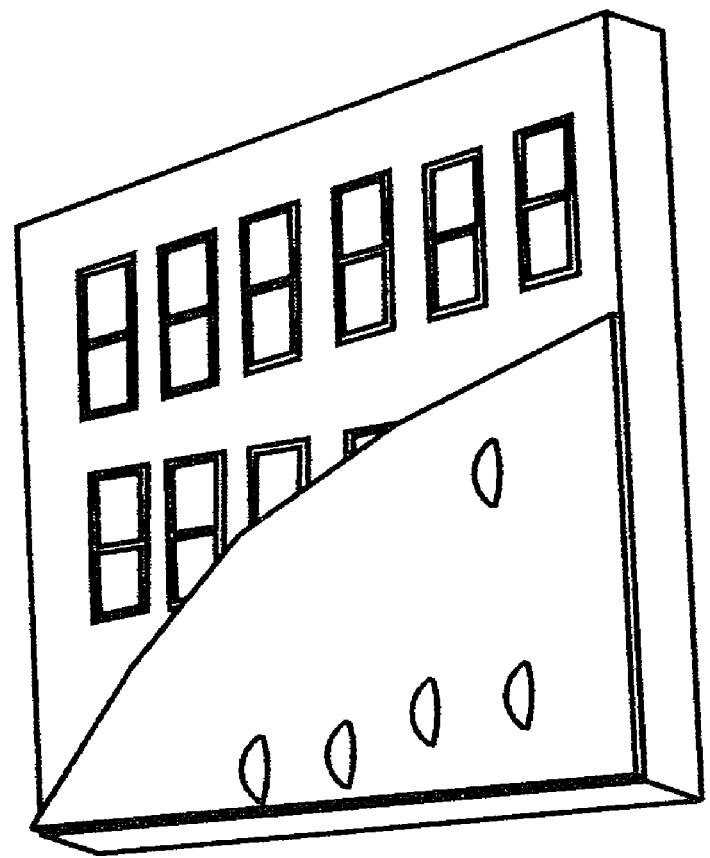
FIGURE 18. Electrode pattern for 6x3 cavities with 2 top and 2 bottom electrodes per cavity (left) and assembled LEPG device with cutaway (right)

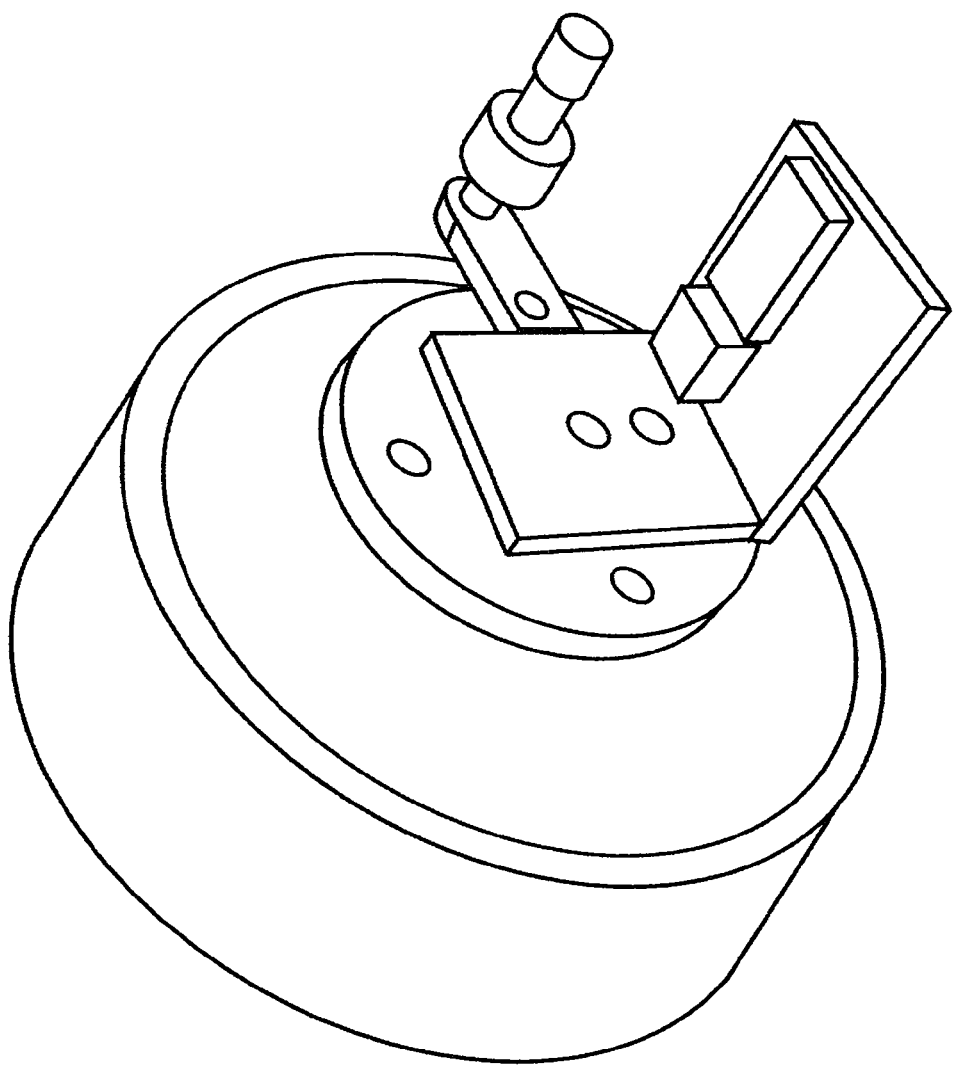
FIGURE 19. Test setup for LEPG mounted on shaker

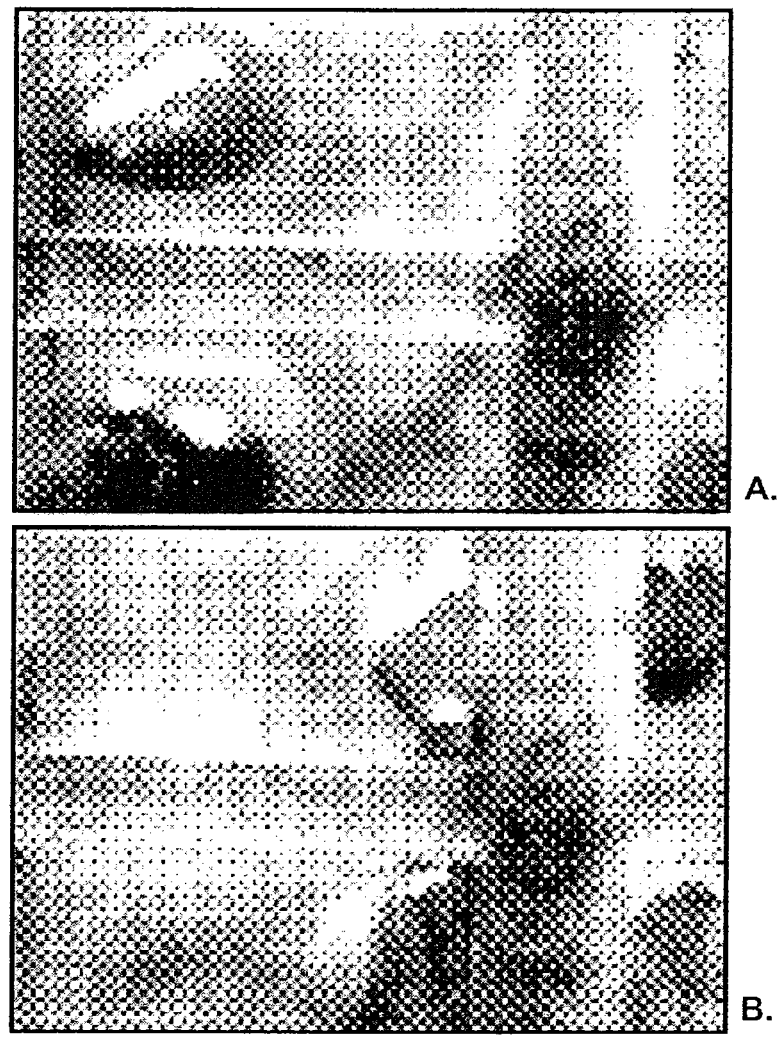
FIGURE 20. Still-frames taken at 2000 fps while shaking at 60Hz and 1 mm peak-to-peak amplitude.

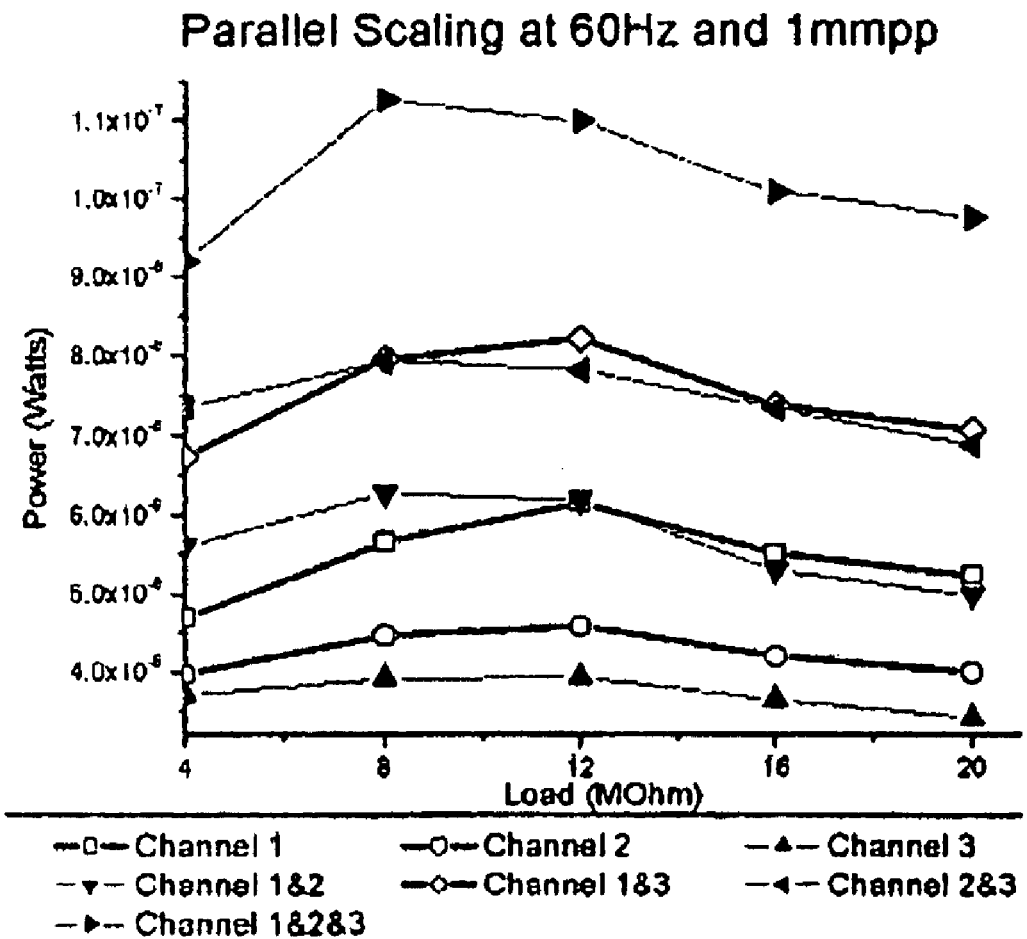
Figure 21. Experimental values for parallel channels shaking of 2.58 mm peak-to-peak at 60Hz. Theoretical values for parallel channels shaking of 1 mm p-p.

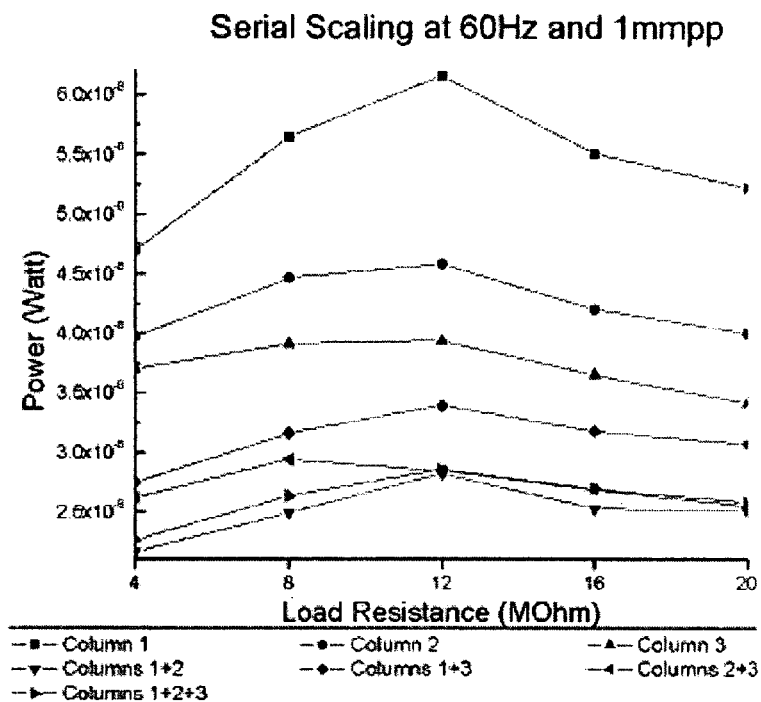
Figure 22. Experimental values for serial columns shaking at 1 mm peak-to-peak at 60Hz..
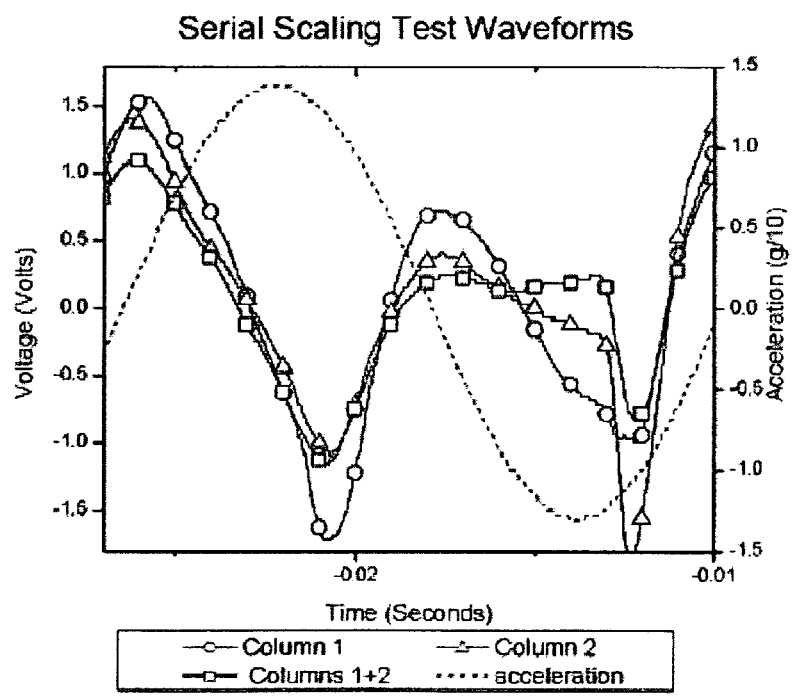
Figure 23. Experimental values for shaking at 2.58 mm peak-to-peak at 60Hz and load resistance of 4 MOhm.

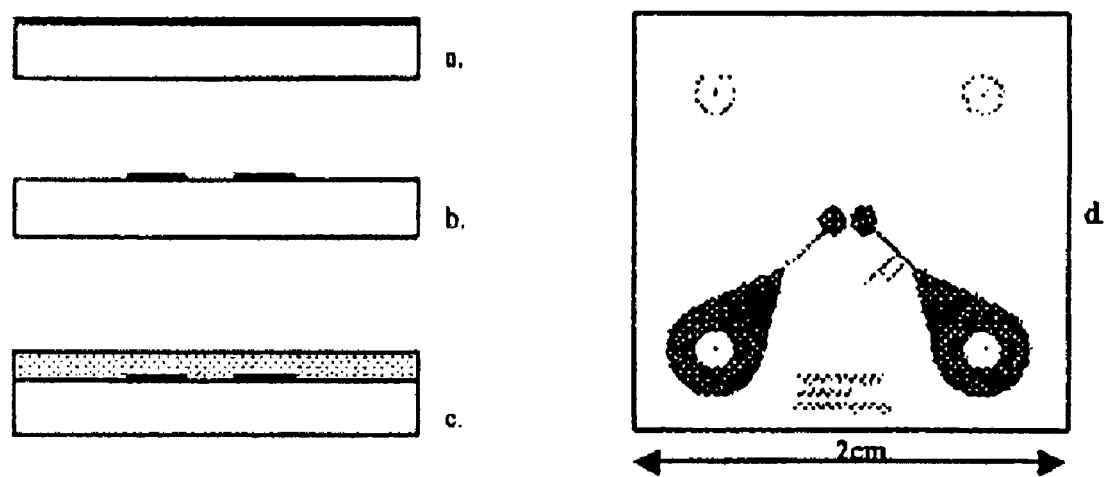
Figure 28. Process Flow a. deposit metal on glass substrate b. pattern metal c. place Teflon PTFE d. mask design used in step b.

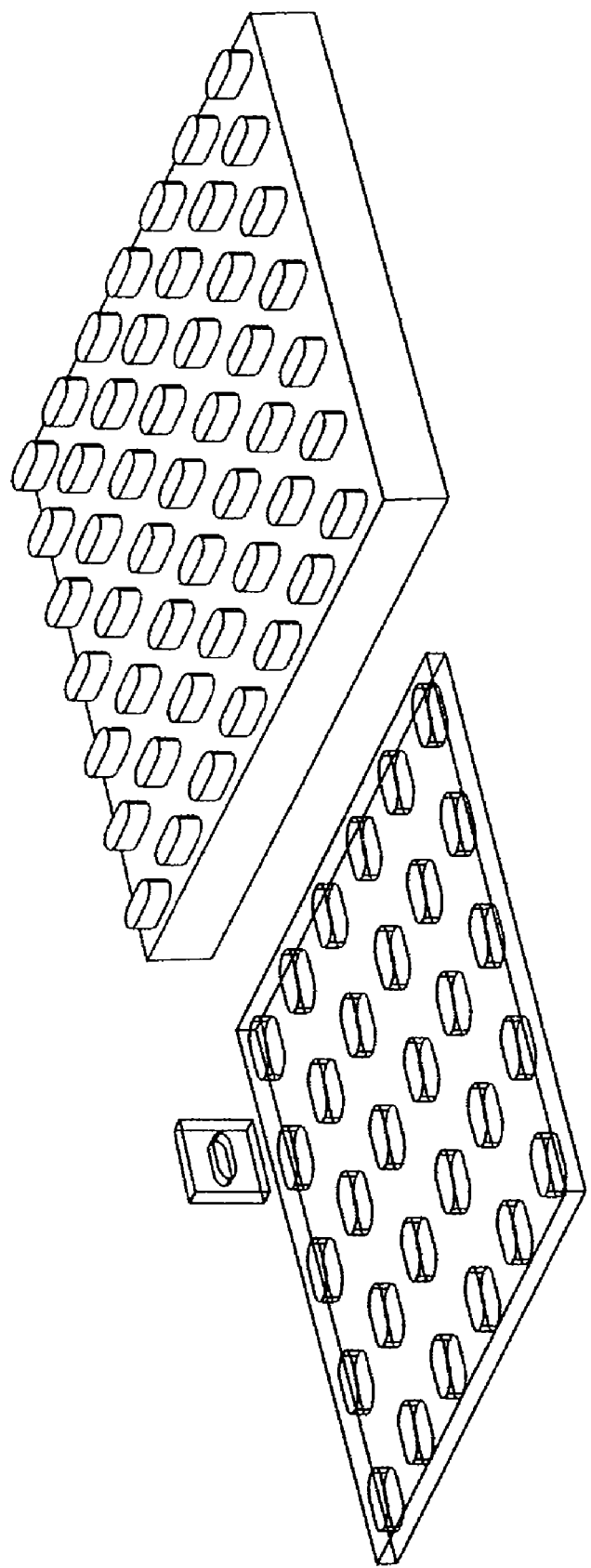
FIGURE 29. Mold Master for Sylgard 184 and peeled PDMS

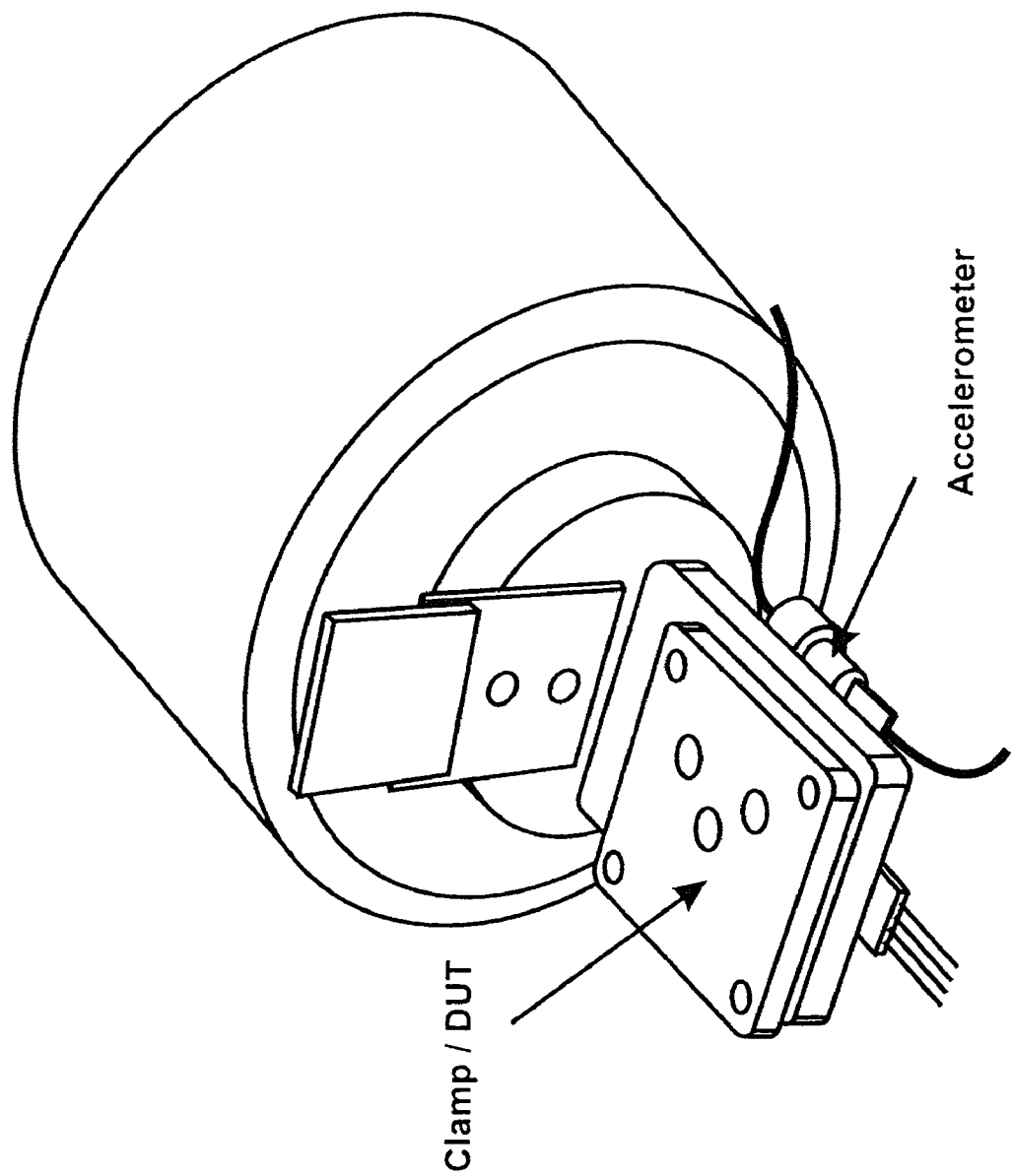
FIGURE 30. Test setup for LEPG mounted on shaker.

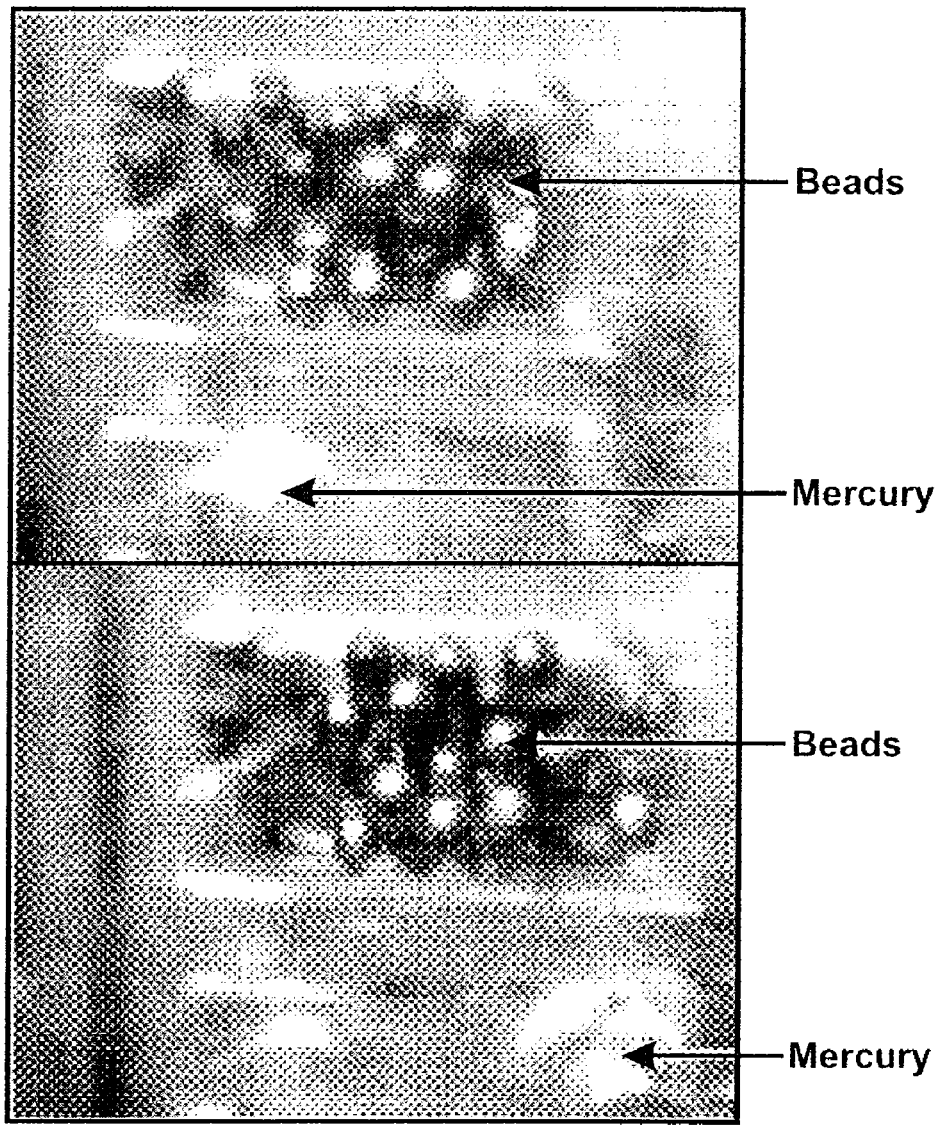
FIGURE 31. High-speed video still-frames taken at t=1/4τ at 2000 fps while shaking 60 Hz and amplitude of 1 mm peak-to-peak.

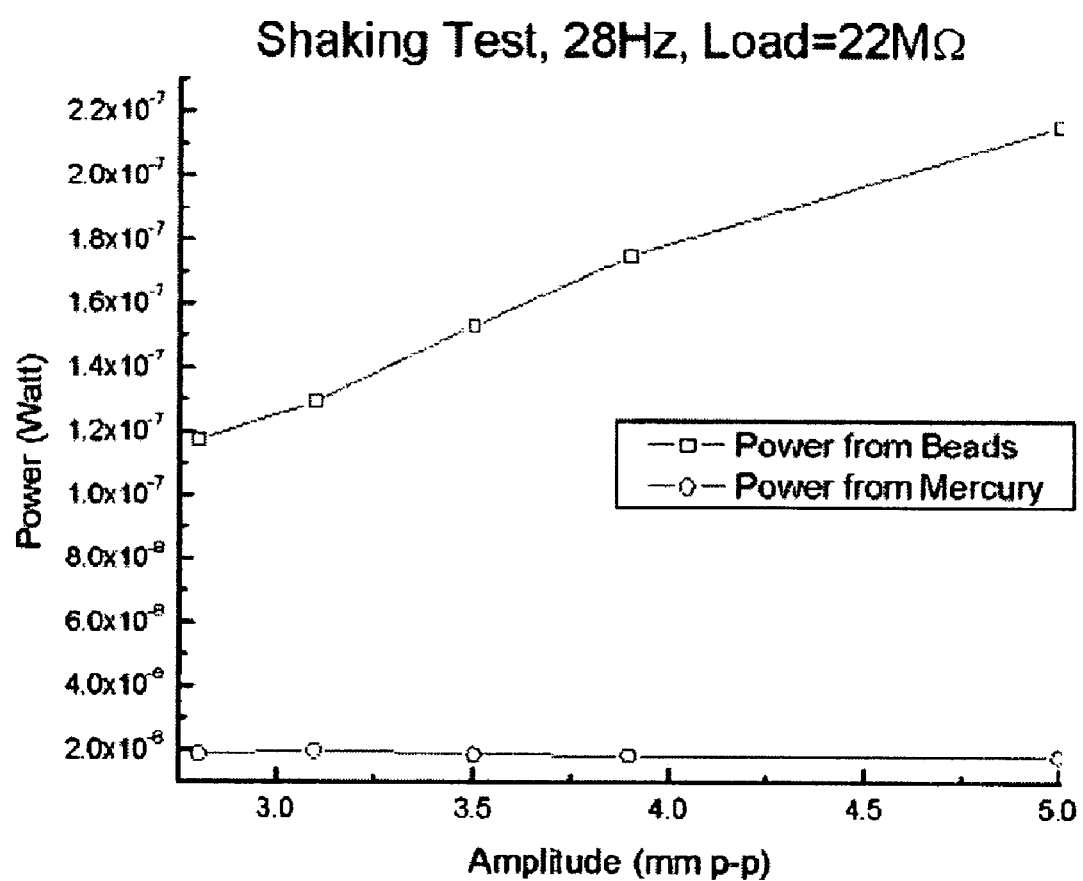
Figure 32. A comparison between steel beads and mercury as dielectric materials for the LEPG.

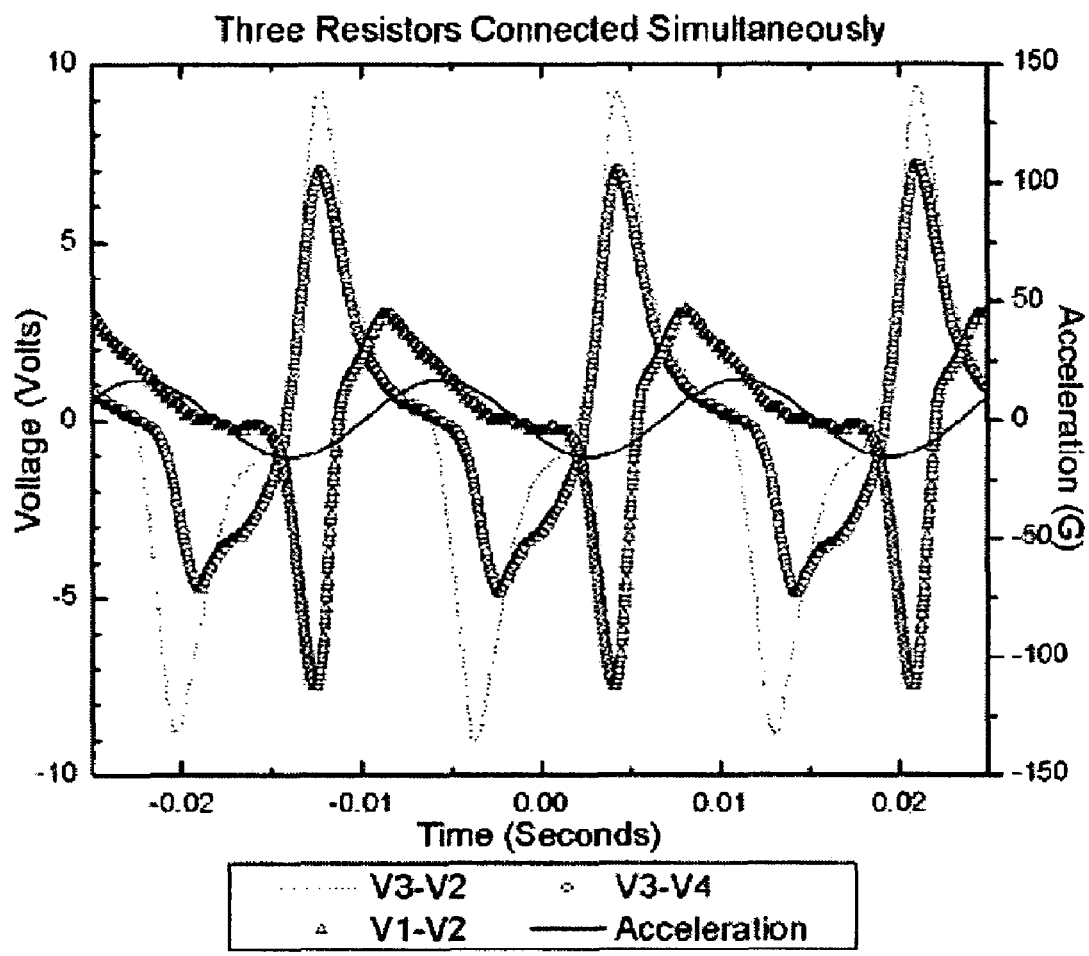
Figure 33. Voltage waveforms with resistors connected across V3-V4, V1-V2, and V2-V3 on an LEPG device shaking at f=60 Hz, displacement = 2 mm p-p, R = 14 MOhm for all three resistors.

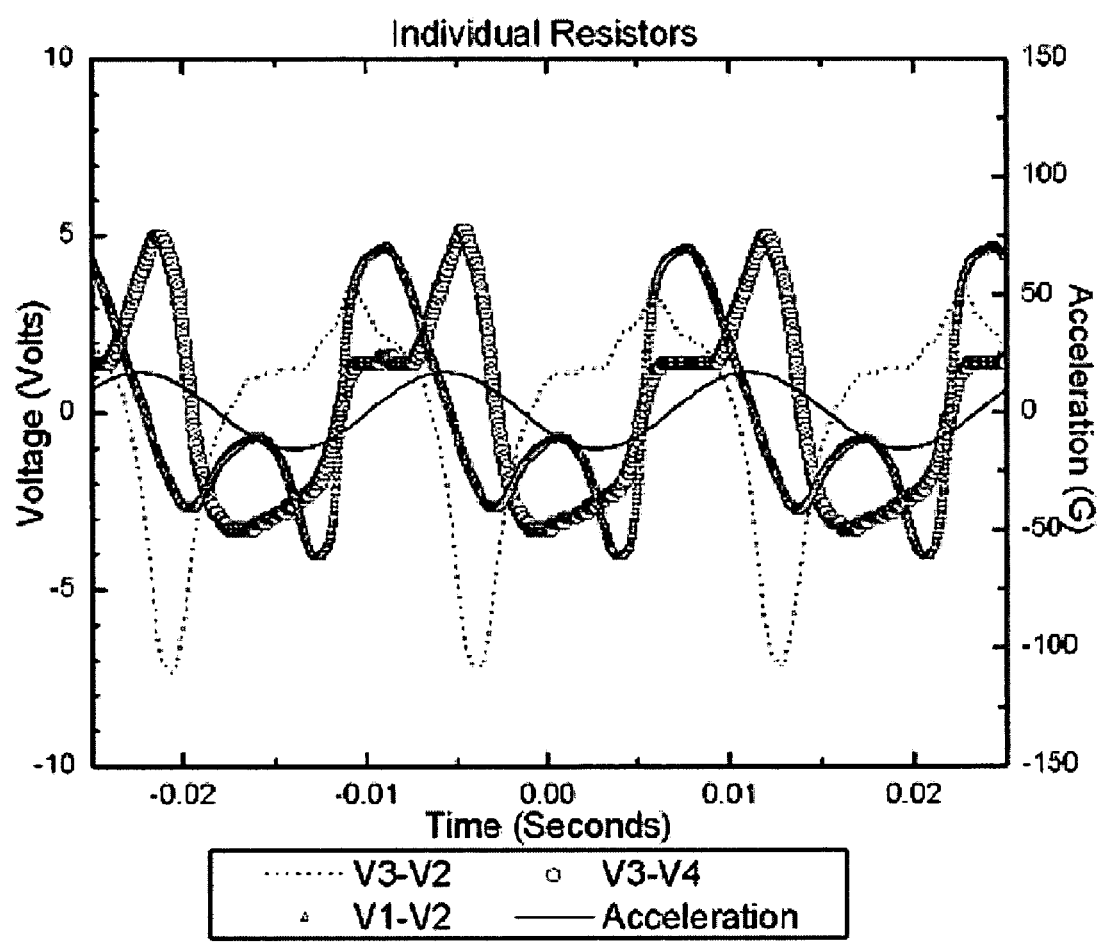
Figure 34. Waveforms from same connections as figure 33 except only one resistor is connected at any time.

METHOD AND SYSTEM USING LIQUID DIELECTRIC FOR ELECTROSTATIC POWER GENERATION

CROSS-REFERENCES TO RELATED APPLICATIONS

This present application claims priority to U.S. Provisional Patent Applications Nos. 60/577,904 (CIT No. 4125-P) filed Jun. 7, 2004, 60/578,117 (CIT No. 4126-P) filed Jun. 7, 2004, and 60/577,864 (CIT No. 4127-P) filed Jun. 7, 2004, each of which is in the names of Justin Boland and Yu-Chong Tai, commonly owned, and hereby incorporated by reference for all purposes.

STATEMENT AS TO RIGHTS TO INVENTIONS MADE UNDER FEDERALLY SPONSORED RESEARCH OR DEVELOPMENT

This work was partially supported by DARPA under Award Number DAAH01-01-R002.

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention generally relates to electrical production. More particularly, the invention provides a method and resulting device for fabricating an electret device having a liquid dielectric entity for generation of electrical power. Merely by way of example, the electret device has been fabricated using a patterning process including micromachining processes. But it would be recognized that other processes such as molding, casting, laser ablation, direct printing, etc. can also be used.

Electromagnetic generators have been used to supply power to a variety of applications. Extremely large power generators exist, such as those providing power using movement of water from large rivers that have been controlled by dams. As merely an example, Hoover Dam produces electricity for Los Angeles, Calif., United States of America. Alternatively, electromagnetic generators can be small to supply power to operate certain electronic functions on automobiles, home appliances, and personal appliances. Other types of generators also exist.

As merely an example, one type of electromagnetic generator is a direct current ("DC") generator. Often times, the DC generator uses a rotating member that converts mechanical kinetic energy into electrical energy. Such conversion is provided by a rotating member called an armature, which carries conductors. The rotating member is within a magnetic field. To generate power, mechanical force is applied to the armature, which rotates within the magnetic field. Here, the armature turns about an axis which extends along the magnetic field. The rotation or twist of the armature within the field generates electric energy including voltage and current. The voltage and current are delivered through external load circuitry. Power generation from electromagnetic generators comes from what we understand as electromagnetic forces. Further details of the theory and operation of the electromagnetic generator can be found in The Bureau of Naval Personal, BASIC ELECTRICITY, Second Revised and Enlarged Edition, Dover Publications, Inc., New York (1969), among other sources.

Although highly effective for certain applications, electromagnetic generators have limitations as they become smaller and smaller. As merely an example, electromagnetic generators have been ineffective for providing power for applications having a form factor of less than one cubic centimeter. Conventional electromagnetic generators often cannot provide enough power as the size of the armature becomes less than an inch to operate many modern electronic devices such as cell phones, personal digital assistants, pagers, pace makers, and the like.

As merely an example, one of the smallest known commercial electromagnetic generators are being used has been developed by Seiko's Kinetic™ series watches of Seiko Corporation (herein "Seiko") of the United States of America. The peak power output from these generators is less than 40 microwatts, and not sufficient for continuous operation of the watch hands. To emphasize the problems, Seiko must often use a backup system inside their watches as well as many power saving techniques to keep time. Functionality of the watch is sacrificed due to the lack of a sufficient power supply. Accordingly, modern electronic devices still rely upon power from chemical power sources such as batteries, which often have a fixed life, are difficult to charge, and cumbersome.

Accordingly, electret generators are proposed to meet the needs of small scale electricity generation for portable and remote location electronics. These electret generators rely upon electromotive force that is purely electric, rather than electromagnetic force used by conventional electromagnetic generators. Electret generator theory and experiments have been reported by O. D. Jefimenko, IEEE Trans. Ind. Appl., Vol. IA-I4, pp. 537-540, 1978 and by Y. Tada, IEEE Trans. Elect. Insul. EI-21, 1986, pp. 457-464. An electret generator with a radius of 45 mm was studied by Y. Tada, Jpn. J. Appl. Phys., Vol. 31, Part 1, No. 3, 1992, pp. 846-851. Here, a maximum reported power output from an electret generator was 1.02 mW. Unfortunately, conventional electret generators still lack a capability of becoming smaller and more effective and have not seen any commercial use. These and other limitations are described in further detail throughout the present specification and more particularly below.

From the above, it is seen that improved techniques for power generation is highly desirable.

BRIEF SUMMARY OF THE INVENTION

According to the present invention, techniques related to electrical production are provided More particularly, the invention provides a method and resulting device for fabricating an electret device having a liquid dielectric entity, which is movable within a spatial region, for generation of electrical power. Merely by way of example, the electret device has been fabricated using a patterning process including micromachining processes. But it would be recognized that other processes such as molding, casting, laser ablation, direct printing, etc. can also be used. Additionally, the liquid dielectric entity can be any movable liquid (or certain other fluids), solid entities, which may behave like a liquid, any combination of these, and the like.

In a specific embodiment, the present invention provides a system for generating power. The system has a first electrode member comprising a first region and a second electrode member comprising a second region. Preferably, the second electrode member is coupled to the first electrode member. An electret is coupled between the first electrode member and the second electrode member. The system has a spatial region provided between the first region of the first electrode member and the second region of the second electrode member. A volume of fluid (e.g., liquid, liquid and solids, gas and liquid, solid and gas, solid, liquid, and gas, a collection of solids, which behave similar to a liquid or have fluid-like characteristics) is provided between the first region and the second region and is adapted to move between the first region and the second region to cause a change in an electric field characteristic within a portion of the spatial region by the movement of at least a portion of the fluid within the portion of the spatial region to generate a change in voltage potential between the first electrode and the second electrode.

In a specific embodiment, the present invention provides a method for generating power. The method includes providing a volume of fluid within a spatial region provided between a first region of a first electrode member and a second region of a second electrode member. In a preferred embodiment, he first region and the second region has an electret material coupled between the first region and the second region. The method also moves at least a portion of the volume of fluid within a portion of the spatial region between the first region and the second region to cause a change in an electric field characteristic within the portion of the spatial region by at least the movement of at least the portion of the fluid. A change in voltage potential is generated between the first electrode and the second electrode from at least the change in the electric field characteristic caused by at least the movement of at least the portion of the fluid.

In an alternative specific embodiment, the invention provides an alternative system for generating power using a liquid dielectric material coupled to an electret. The system has a first electrode member comprising a first surface region and a second electrode member comprising a second surface region. In a preferred embodiment, the second electrode member is coupled to the first electrode member. An electret is coupled between the first electrode member and the second electrode member. A spatial volume is provided between the first surface region of the first electrode member and the second surface region of the second electrode member. The system has a fluid capable of movement within the spatial volume between the first surface region and the second surface region. In a preferred embodiment, the movement of a portion of the fluid causes a change in an electric field characteristic within a portion of the spatial volume.

In an alternative specific embodiment, the present invention provides a system for generating power. The system has a plurality of power generating devices. Each of the power generating devices has a first electrode member comprising a first region and a second electrode member comprising a second region. Preferably, the second electrode member is coupled to the first electrode member. An electret is coupled between the first electrode member and the second electrode member. A spatial region is provided between the first region of the first electrode member and the second region of the second electrode member. Each of the devices has a volume of fluid adapted to move between the first region and the second region to cause a change in an electric field characteristic within a portion of the spatial region by the movement of at least a portion of the fluid within the portion of the spatial region to generate a change in voltage potential between the first electrode and the second electrode. In a specific embodiment, the plurality of devices are arranged in an array configuration, which may be two dimensional or even three dimensional or other configurations. In the two dimensional configuration, the array has a plurality of rows numbered from 1 through N, and a plurality of columns numbered from 1 through M. In the three dimensional array configuration, the array has a plurality of rows numbered from 1 through N, a plurality of columns numbered from 1 through M. Each of the rows and each of the columns occupy at least one of a plurality of layers numbered from 1 through Z, were Z is an integer of two (2) or greater.

In still a further alternative embodiment, the present invention provides a system for generating power using at least two or more electrode members and an electret material coupled in between. The system has at least two or more electrode members. Each of the electrode members comprises a surface region. An electret is coupled between any two of the electrode members. A spatial volume is provided between any two of the surface regions from respective two electrode members. The system has a volume of fluid capable of movement within a portion of the spatial volume between the two surface regions. In a preferred embodiment, the movement causes a change in an electric field characteristic within a portion of the spatial volume. Preferably, a multi-dimensional (e.g., three) array may be formed using each pair of electrode members coupled to an electret according to a specific embodiment.

Still further, the present invention provides a system for generating and storing power. The system has an enclosure comprising three dimensional spatial volume. The three dimensional spatial volume is provided within an entirety or a portion of the enclosure according to a specific embodiment. The system has a plurality of power generating devices provided within a portion of the three dimensional spatial volume in the enclosure. Each of the power generating devices has a first electrode member comprising a first region and a second electrode member comprising a second region. In a preferred embodiment, the second electrode member is coupled to the first electrode member. An electret is coupled between the first electrode member and the second electrode member. A spatial region is provided between the first region of the first electrode member and the second region of the second electrode member. In a preferred embodiment, each of the device has a volume of fluid adapted to move between the first region and the second region to cause a change in an electric field characteristic within a portion of the spatial region by the movement of at least a portion of the fluid within the portion of the spatial region to generate a change in voltage potential between the first electrode and the second electrode. Depending upon the embodiment, the enclosure is provided within a portion of a battery device or encloses a battery device.

In still a further embodiment, the present invention provides a device for detecting spatial movement of an entity. The device has a first electrode member comprising a first region and a second electrode member comprising a second region. The second electrode member is coupled to the first electrode member. An electret is coupled between the first electrode member and the second electrode member. A spatial region is provided between the first region of the first electrode member and the second region of the second electrode member. The device has a volume of fluid adapted to move between the first region and the second region to cause a change in an electric field characteristic within a portion of the spatial region by the movement of at least a portion of the fluid within the portion of the spatial region. The device has an output device coupled between the first electrode and the second electrode. In a preferred embodiment, the output device is capable of transmitting one or more indications associated with the change in the electric field characteristic within the portion of the spatial volume region provided by the movement of at least a portion of the fluid within the portion of the spatial volume. In a specific embodiment, the movement of the portion of the fluid comprises a magnitude characteristic, which is associated to quantify a spatial movement of the device.

In an alternative embodiment, the present invention provides a system for generating and using electric power. The system has a first electrode member comprising a first region and a second electrode member comprising a second region. The second electrode member is coupled to the first electrode member. An electret is coupled between the first electrode member and the second electrode member. A spatial region is provided between the first region of the first electrode member and the second region of the second electrode member. The system has a volume of fluid adapted to move between the first region and the second region to cause a change in an electric field characteristic within a portion of the spatial region by the movement of at least a portion of the fluid within the portion of the spatial region to generate a change in voltage potential between the first electrode and the second electrode. In a preferred embodiment, an output device is coupled to the first electrode and the second electrode. An extraction circuit is coupled to the output device. In a preferred embodiment, the extraction circuit is adapted to receive a first set of signals associated with at least the change in voltage potential from the output device and to convert the first set of signals into one or more signals with an associated power. A load device (e.g., battery, capacitor, motor, light, heater) is coupled to the extraction circuit. In a preferred embodiment, the load device is adapted to consume at least a portion of the power associated with the one or more signals.

Optionally, the present system and methods can be implemented for a large scale use from spatial movement derived from a macroscopic event according to a specific embodiment. The macroscopic event may includes a seismic motion, wind, thermal gradients, gravitation motion, ocean waves, or any combination of these, and the like. Additionally, the macroscopic event can be derived from a kinetic energy, including vibrational and/or translational and/or rotational, from a machine, e.g., air conditioner, an automobile, a suspension bridge, an airplane, an airplane wing, any movable entity.

Optionally, the present systems and methods can be implemented for a remote or movable application according to a specific embodiment. The system is provided in a housing, which includes a three dimensional spatial volume. In a specific embodiment, the housing is implanted in a human body or other living entity and/or worn on a human body or other living entity. In a specific embodiment, the housing is sealed and resistant to wear and tear, substantially non-reactive to chemical and/or thermal conditions, and is generally resistant to external conditions, e.g., mechanical, chemical, thermal, physical. Of course, there can be other variations, modifications, and alternatives.

Still further, the present invention provides a method for providing power generation for an entity, e.g., human, animal, mechanical. The method includes providing a housing, which has a three dimensional spatial volume. The housing has a first electrode member coupled to the housing and a second electrode member coupled to the housing. In a preferred embodiment, the second electrode member is coupled to the first electrode member. An electret is coupled between the first electrode member and the second electrode member. A spatial region is provided between the first region of the first electrode member and the second region of the second electrode member. A volume of fluid is adapted to move between the first region and the second region to cause a change in an electric field characteristic within a portion of the spatial region by the movement of at least a portion of the fluid within the portion of the spatial region to generate a change in voltage potential between the first electrode and the second electrode. In a preferred embodiment, the method couples the housing onto a biological entity. Depending upon the embodiment, coupling occurs using implanting, attaching, or other attachment mechanisms, and the like, which that housing can be provided within the entity or worn outside the entity or a combination of these.

Numerous benefits are achieved using the present invention over conventional techniques. The invention can be implemented using conventional process technology. In other embodiments, the invention can be provide a micromachined electret structure, which can be used for a variety of applications. Preferably, the invention provides a highly uniform electret material, which is much better than conventional techniques. Electric field uniformity can be less than 5% or even 1% peak to peak in certain embodiments. Additionally, the present invention uses a fluid based electret device and system. Such device and system are difficult to wear out and has high reliability according to a specific embodiment. Depending upon the embodiment, one or more of these benefits may be achieved. These and other benefits are described throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIG. 1 is a simplified diagram of an electret power generating device according to an embodiment of the present invention;

FIG. 2 is a simplified diagram of an alternative electret power generating device according to an alternative embodiment of the present invention;

FIGS. 6 through 14 illustrate various simplified diagrams of a liquid rotor electret power generator according to an embodiment of the present invention;

FIG. 15 is a simplified diagram of an electret power generator in an array configuration according to an embodiment of the present invention;

FIGS. 16 through 27 illustrate various simplified diagrams of an arrayed liquid electret power generator according to an embodiment of the present invention; and FIGS. 28 through 34 illustrate various simplified diagrams of an alternative liquid electret power generator according to an alternative embodiment of the present invention.

DETAILED DESCRIPTION OF THE INVENTION

Figure 3:
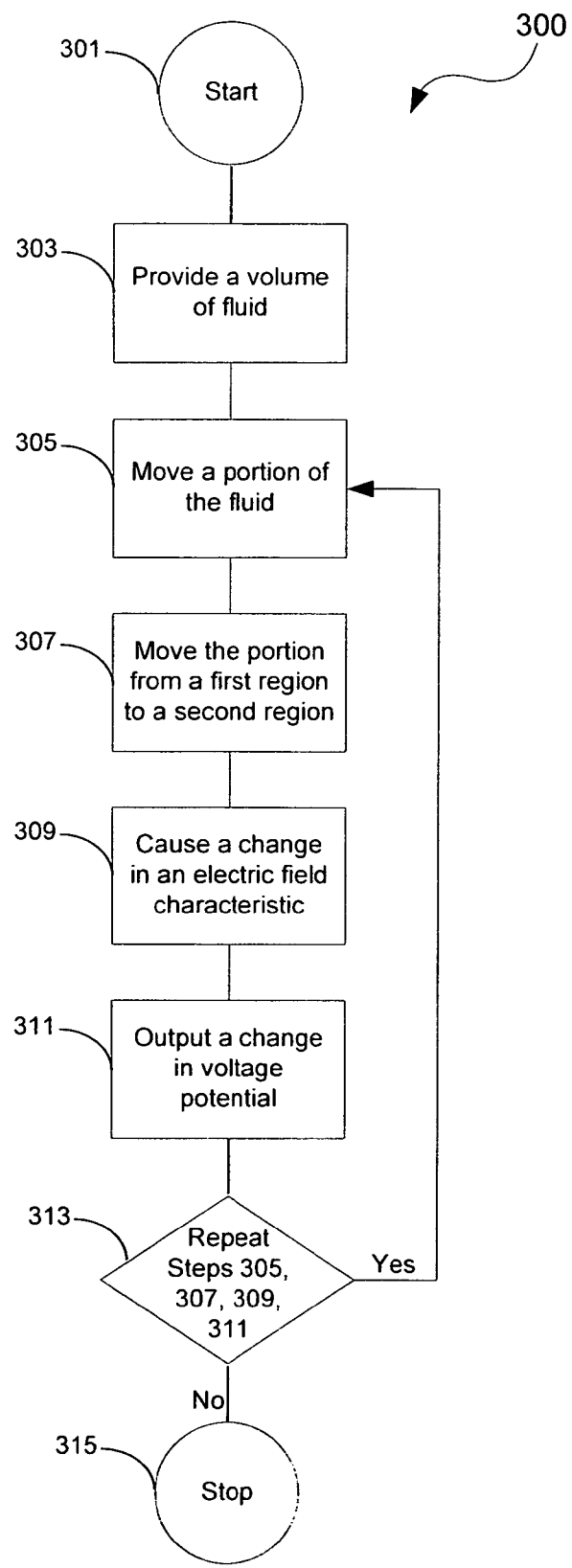
FIG. 3 is a simplified flow diagram illustrating a power generating method according to an embodiment of the present invention.

According to the present invention, techniques related to electrical production are provided More particularly, the invention provides a method and resulting device for fabricating an electret device having a liquid dielectric entity for generation of electrical power. Merely by way of example, the electret device has been fabricated using a patterning process including micromachining processes. But it would be recognized that other processes such as molding, casting, laser ablation, direct printing, etc. can also be used. Additionally, the liquid dielectric entity can be any movable liquid (or certain other fluids), solid entities, which may behave like a liquid, any combination of these, and the like.

FIG. 1 is a simplified diagram of an electret power generating device 100 according to an embodiment of the present invention. This diagram is merely an illustration, which should not unduly limit the scope of the claims herein. One of ordinary skill in the art would recognize other variations, modifications, and alternatives. As shown, the device has a first electrode member 101 comprising a first region 102. In a preferred embodiment, the first electrode member is made of a conductive material, which may be a single layer, multi-layered, or any combination of these. The device also has a second electrode member 105 comprising a second region 106. In a preferred embodiment, the first electrode member is made of a conductive material, which may be a single layer, multi-layered, or any combination of these. The conductive material can be any suitable metal (which is listed on the Period Table of Elements), any alloy, conductive polymers, conductive semiconductors, or any combination of these, and the like. As merely an example, the electrodes can be made of a nickel, nickel alloy, aluminum, aluminum alloy, or any other suitable metal member. Depending upon the embodiment, each of the electrodes can also have a variety of shapes and sizes. That is, the electrodes can be planar, curved or annular, any combination of these, and other configurations without departing from the scope of the claims herein. As shown, the second electrode member is coupled to the first electrode member.

An electret 107 is coupled between the first electrode member and the second electrode member. In a specific embodiment, the electret is overlying the first electrode. In a specific embodiment, the term electret can be defined as a piece of dielectric material exhibiting a quasi-permanent electrical charge. The term quasi-permanent means that the time constants characteristic for the decay of the charge are much longer than the time periods over which studies are performed with the electret. Alternatively, other definitions for electret can also be used, depending upon the embodiment without departing from the spirit of the scope of the claims herein.

In a specific embodiment, the invention provides a suitable electret device. The electret device has a thickness of substrate material having a contact region. An electrically floating conducting region is formed overlying the thickness of substrate material. The floating conducting region is free from physical contact with the contact region. A protective layer is formed overlying the floating conductive region. The protective layer has a surface region and seals the floating conducting region. The thickness of substrate material, floating conducting region, and protective layer form a sandwiched structure having a apparent charge density of at least $1 \times 10^{-4}$ Coulombs/m$^2$ and a peak to peak electric field non-uniformity of 5% and less as measured directly above the protective layer. As an example, the electret can be made according to the techniques in U.S. Ser. No. 10/455,226 filed Jun. 4, 2003 (Attorney Docket Number 020859-001710US), commonly assigned and hereby incorporated by reference for all purposes. Other ways of charging may be tribo-electric and others, depending upon the specific embodiment.

In a specific embodiment, the device has a spatial region 113 provided between the first region of the first electrode member and the second region of the second electrode member. The spatial region also includes region 115 according to a specific embodiment. The spatial region is enclosed within a total region 109. As shown, the spatial region may include a first portion 113 and a second portion 115, as well as other portions, depending upon the embodiment. In a specific embodiment, the spatial region is a gap or spaced region between the two electrode members. As shown, the spaced region is substantially parallel to each of the electrodes and is characterized by a width, length, and depth according to a specific embodiment. The spaced region is preferably a three-dimensional space according to a specific embodiment. We note that the term "spatial region" is not intended to be limiting and should be construed by its ordinary meaning according to one of ordinary skill in the art. In a specific embodiment, the spatial region is a sealed cavity region that contains a fluid therein. The sealed cavity can be within a single spatial region or among various regions depending upon the specific embodiment. Depending upon the type of fluid, there can also be one or more spatial regions that are not fully enclosed or sealed. Of course, there can be other variations, modifications, and alternatives.

Referring to reference numeral 111 the Figure, a volume of fluid (e.g., liquid, liquid and solids, gas and liquid, liquid and vapor, any combination of these) is provided between the first region and the second region according to a specific embodiment. The volume of liquid is adapted to move between the first region and the second region to cause a change in an electric field characteristic. The volume of liquid moves within a portion of the spatial region by the movement of at least a portion of the fluid within the portion of the spatial region. In a preferred embodiment, the movement of the volume of fluid generates a change in voltage potential between the first electrode and the second electrode. In a specific embodiment, the liquid can be any suitable liquid such as mercury, gallium, or other liquid eutectic metals others, depending upon the application. Additionally, the liquid can also include solid entities or the liquid can be a one or more solid entities that behave similar to a liquid according to a specific embodiment. Of course, there can be other variations, modifications, and alternatives.

The above example is merely an illustration, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this application and scope of the appended claims. Additionally, any of the elements described herein and outside of the specification. may be combined with the elements of the embodiments above. Further details of the present system can be found throughout the present specification and more particularly below.

FIG. 2 is a simplified diagram 200 of an alternative electret power generating device 200 according to an alternative embodiment of the present invention. This diagram is merely an illustration, which should not unduly limit the scope of the claims herein. One of ordinary skill in the art would recognize other variations, modifications, and alternatives. Like reference numerals are used in the diagram, but are not intended to be limiting. Additionally, any of the elements described above, as well as through the present specification, can be combined with the present electret power generating device 200 without departing from the scope of the claims herein. Of course, one of ordinary skill in the art would recognize many variations, modifications, and alternatives.

As shown, the device has a first electret power generating device 210 and a second electret power generating device 220. Each of these devices is operably coupled to the total spatial volume region 109. Each of these devices also work together with the volume of fluid according to a specific embodiment.

As shown, the first device has a first electrode member 101 comprising a first region 102. In a preferred embodiment, the first electrode member is made of a conductive material, which may be a single layer, multi-layered, or any combination of these. The device also has a second electrode member 105 comprising a second region 106. In a preferred embodiment, the first electrode member is made of a conductive material, which may be a single layer, multi-layered, or any combination of these. As shown, the second electrode member is coupled to the first electrode member.

An electret 107 is coupled between the first electrode member and the second electrode member. In a specific embodiment, the electret is overlying the first electrode. In a specific embodiment, the term electret can be defined as a piece of dielectric material exhibiting a quasi-permanent electrical charge. The term quasi-permanent means that the time constants characteristic for the decay of the charge are much longer than the time periods over which studies are performed with the electret. Alternatively, other definitions for electret can also be used, depending upon the embodiment without departing from the spirit of the scope of the claims herein.

In a specific embodiment, the invention provides a suitable electret device. The electret device has a thickness of substrate material having a contact region. An electrically floating conducting region is formed overlying the thickness of substrate material. The floating conducting region is free from physical contact with the contact region. A protective layer is formed overlying the floating conductive region. The protective layer has a surface region and seals the floating conducting region. The thickness of substrate material, floating conducting region, and protective layer form a sandwiched structure having a apparent charge density of at least $1 \times 10^{-4}$ Coulombs/m$^2$ and a peak to peak electric field non-uniformity of 5% and less as measured directly above the protective layer.

In a specific embodiment, the first device has a spatial region 113 provided between the first region of the first electrode member and the second region of the second electrode member. The spatial region also includes region 115 according to a specific embodiment. The spatial region is enclosed within a total region 109. As shown, the spatial region may include a first portion 113 and a second portion 115, as well as other portions, depending upon the embodiment. Of course, there can be other variations, modifications, and alternatives.

Referring to reference numeral 111 the Figure, a volume of fluid (e.g., liquid, liquid and solids, gas and liquid) is provided between the first region and the second region according to a specific embodiment. The volume of liquid is adapted to move between the first region and the second region to cause a change in an electric field characteristic. The volume of liquid moves within a portion of the spatial region by the movement of at least a portion of the fluid within the portion of the spatial region. In a preferred embodiment, the movement of the volume of fluid generates a change in voltage potential between the first electrode and the second electrode. Of course, there can be other variations, modifications, and alternatives.

Referring again to the Figure, spatial region 115 is coupled to a third electrode member 201 and a fourth electrode member 203. The third electrode member has a third region and the fourth electrode member has a fourth region. The third and fourth electrode members are operable independent and apart from the first and second electrode members according to a specific embodiment. A second electret 205 is formed on the third region of the third electrode member according to the present embodiment. As shown, the third and fourth electrode members correspond to a second electret power generating device. The first and second electrode members correspond to a first electret power generating device according to a specific embodiment. Of course, there can be other variations, modifications, and alternatives.

The above example is merely an illustration, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this application and scope of the appended claims. Additionally, any of the elements described herein and outside of the specification may be combined with the elements of the embodiments above. Further details of the present system and methods can be found throughout the present specification and more particularly below.

A method according to an embodiment of the present invention for generating power is provided below:

1. Provide a volume of fluid within a spatial region provided between a first region of a first electrode member and a second region of a second electrode member and an electret coupled between the first region and the second region;

2. Initiate spatial movement of a housing containing the fluid, first electrode, second electrode, and electret;

3. Move at least a portion of the volume of fluid within a portion of the spatial region between the first region and the second region;

4. Cause a change in an electric field characteristic within the portion of the spatial region by at least the movement of at least the portion of the fluid;

5. Generate a change in voltage potential between the first electrode and the second electrode from at least the change in the electric field characteristic caused by at least the movement of at least the portion of the fluid;

6. Continue to generate a voltage potential change by repeating the steps above; and 7. Perform other steps, as desired.

The above sequence of steps provides a method according to an embodiment of the present invention. As shown, the method uses a combination of steps including a way of generating energy using a liquid and an electret power generating device. Other alternatives can also be provided where steps are added, one or more steps are removed, or one or more steps are provided in a different sequence without departing from the scope of the claims herein. Further details of the present method can be found throughout the present specification and more particularly below.

FIG. 3 is a simplified flow diagram 300 illustrating a power generating method according to an embodiment of the present invention. This diagram is merely an illustration, which should not unduly limit the scope of the claims herein. One of ordinary skill in the art would recognize other variations, modifications, and alternatives. As shown, the method begins with start, step 301. In a specific embodiment, the method includes providing (step 303) a volume of fluid within a spatial region provided between a first region of a first electrode member and a second region of a second electrode member. In a preferred embodiment, he first region and the second region has an electret material coupled between the first region and the second region.

In a specific embodiment, the method also moves (step 307) at least a portion of the volume of fluid within a portion of the spatial region between the first region and the second region. Depending upon the embodiment, the movement comes from spatial movement of the entire electrode, electret, and fluid assembly, any relative movement associated with the fluid, or any combination of these. The movement may be along a predefined direction such as an x-y-z spatial orientation, any combination of these, and random movement of the assembly according to a specific embodiment.

Referring to the Figure, the method causes a change (step 309) in an electric field characteristic within the portion of the spatial region by at least the movement of at least the portion of the fluid. The change in electric field occurs by a change in capacitance within the portion of the spatial volume according to a specific embodiment. The change in electric field generates (step 311) a change in voltage potential between the first electrode and the second electrode from at least the change in the electric field characteristic caused by at least the movement of at least the portion of the fluid. In a specific embodiment, the steps are repeated (step 313) to continue to generate the change in voltage potential. The method stops, at step 315. Of course, there can be other variations, modifications, and alternatives.

Although the above method is illustrated using a selected sequence of steps, it would be recognized that various modifications, alternatives, and variations exist. For example, some of the steps may be combined. Alternatively, some of the steps may be separated. Additional steps may be added before, within, or after any of the steps described above. The method can also provide the sequence of steps in a different manner without departing from the scope of the claims herein.

A method according to an alternative embodiment of the present invention for generating power is provided below:

1. Provide a volume of fluid within a spatial region provided between a first region of a first electrode member and a second region of a second electrode member and an electret coupled between the first region and the second region;
2. Initiate spatial movement of a housing containing the fluid, first electrode, second electrode, and electret;
3. Move at least a portion of the volume of fluid within a portion of the spatial region between the first region and the second region;
4. Cause a change in an electric field characteristic within the portion of the spatial region by at least the movement of at least the portion of the fluid;
5. Generate a change in voltage potential between the first electrode and the second electrode from at least the change in the electric field characteristic caused by at least the movement of at least the portion of the fluid;
7. Convert one or more signals associated with the change in voltage potential to a direct current;
8. Continue to generate the direct current by repeating the steps above;
9. Store energy associated with the direct current; and
10. Perform other steps, as desired.

The above sequence of steps provides a method according to an embodiment of the present invention. As shown, the method uses a combination of steps including a way of generating and storing energy using a liquid and an electret power generating device. Other alternatives can also be provided where steps are added, one or more steps are removed, or one or more steps are provided in a different sequence without departing from the scope of the claims herein. Further details of the present method can be found throughout the present specification and more particularly below.

Figure 4:
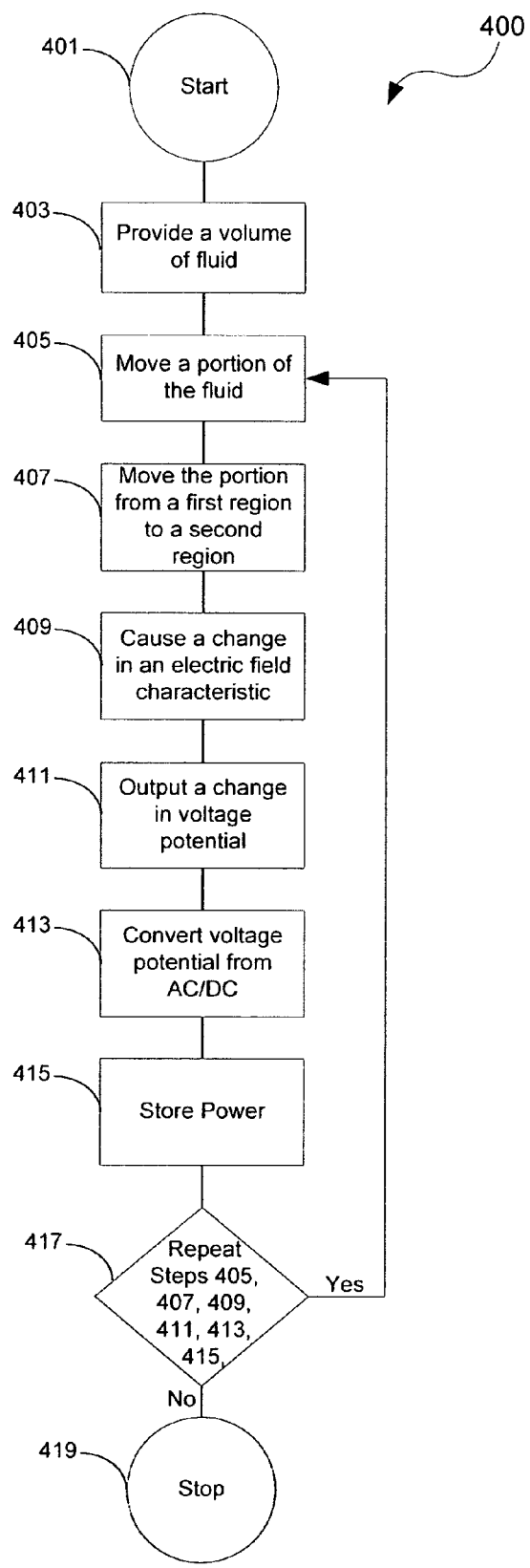
FIG. 4 is a simplified flow diagram illustrating an alternative power generating method according to an alternative embodiment of the present invention.

FIG. 4 is a simplified flow diagram 400 illustrating an alternative power generating method according to an alternative embodiment of the present invention. This diagram is merely an illustration, which should not unduly limit the scope of the claims herein. One of ordinary skill in the art would recognize other variations, modifications, and alternatives. As shown, the method begins with start, step 401. In a specific embodiment, the method includes providing (step 403) a volume of fluid within a spatial region provided between a first region of a first electrode member and a second region of a second electrode member. In a preferred embodiment, he first region and the second region has an electret material coupled between the first region and the second region.

In a specific embodiment, the method also moves (step 407) at least a portion of the volume of fluid within a portion of the spatial region between the first region and the second region. Depending upon the embodiment, the movement comes from spatial movement of the entire electrode, electret, and fluid assembly, any relative movement associated with the fluid, or any combination of these. The movement may be along a predefined direction such as an x-y-z spatial orientation, any combination of these, and random movement of the assembly according to a specific embodiment.

Referring to the Figure, the method causes a change (step 409) in an electric field characteristic within the portion of the spatial region by at least the movement of at least the portion of the fluid. The change in electric field occurs by a change in capacitance within the portion of the spatial volume according to a specific embodiment. The change in electric field generates (step 411) a change in voltage potential between the first electrode and the second electrode from at least the change in the electric field characteristic caused by at least the movement of at least the portion of the fluid.

In a specific embodiment, the method converts (step 413) a change in voltage potential from an alternating type current to a direct current. In a specific embodiment, the conversion can occur through one of a variety of conventional voltage converter devices. As an example, such devices can be synchronous rectification devices, switched power supplies, diode bridge devices, half and full wave bridge rectifiers, and other suitable techniques. Of course, one of ordinary skill in the art would recognize other variations, modifications, and alternatives.

In a specific embodiment, the method also stores (step 415) energy derived from the above steps. Depending upon the embodiment, storage can occur through a capacitor structure, a battery, or any combination of these, and the like. In a specific embodiment, the battery can be a lithium ion type, including lithium manganese, lithium polymer, and others. Batteries using nickel (including other metal hydrides and nickel itself) bearing species may also be used according to a specific embodiment. In a specific embodiment, the steps are repeated (step 417) to continue store energy for later use in one of a variety of applications. The method stops, at step 419. Of course, there can be other variations, modifications, and alternatives.

Although the above method is illustrated using a selected sequence of steps, it would be recognized that various modifications, alternatives, and variations exist. For example, some of the steps may be combined. Alternatively, some of the steps may be separated. Additional steps may be added before, within, or after any of the steps described above. The method can also provide the sequence of steps in a different manner without departing from the scope of the claims herein.

A method for providing power generation for an entity, e.g., human, animal, mechanical, according to an embodiment of the present invention may be outlined below.

1. Provide a housing, which has a three dimensional spatial volume, and power generating device therein;
2. Couple the housing onto a biological entity;
3. Move biological entity with housing;
4. Cause related movement to the power generating device;
5. Generate power from the device;
6. Load the device;
7. Store energy derived from the device; and
8. Perform other steps, as desired.

The above sequence of steps provides a method according to an embodiment of the present invention. As shown, the method uses a combination of steps including a way of coupling an electret power generating device to a biological entity for use with the biological entity. Other alternatives can also be provided where steps are added, one or more steps are removed, or one or more steps are provided in a different sequence without departing from the scope of the claims herein. Further details of the present method can be found throughout the present specification and more particularly below.

Figure 5:
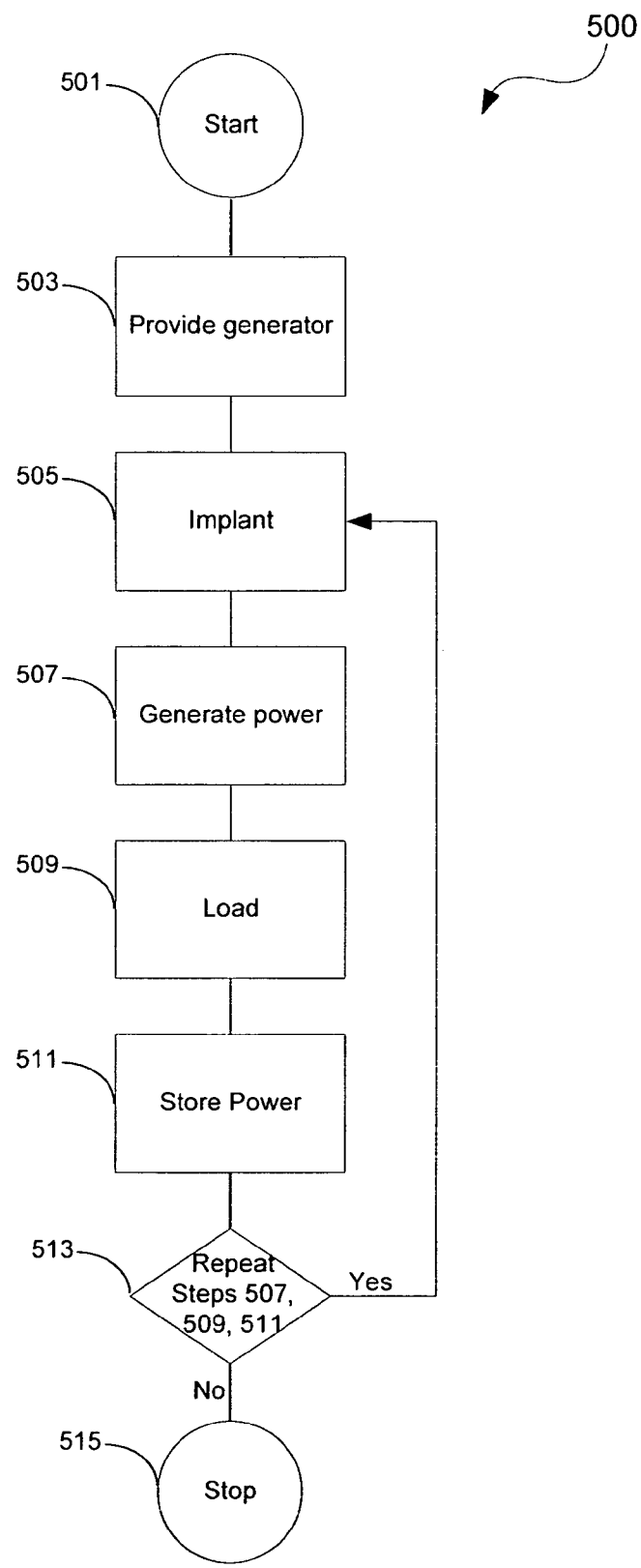
FIG. 5 is a simplified flow diagram illustrating yet an alternative power generating method according to an alternative embodiment of the present invention.

FIG. 5 is a simplified flow diagram 500 illustrating yet an alternative power generating method for one or more entities according to an alternative embodiment of the present invention. This diagram is merely an illustration, which should not unduly limit the scope of the claims herein. One of ordinary skill in the art would recognize other variations, modifications, and alternatives. As shown, the present method begins at start, step 501. The method is for providing power generation for an entity, e.g., human, animal, mechanical.

In a specific embodiment, the method includes providing (step 503) a housing, which has a three dimensional spatial volume. The housing has a first electrode member coupled to the housing and a second electrode member coupled to the housing. In a preferred embodiment, the second electrode member is coupled to the first electrode member. An electret is coupled between the first electrode member and the second electrode member. A spatial region is provided between the first region of the first electrode member and the second region of the second electrode member. A volume of fluid is adapted to move between the first region and the second region to cause a change in an electric field characteristic within a portion of the spatial region by the movement of at least a portion of the fluid within the portion of the spatial region to generate a change in voltage potential between the first electrode and the second electrode. The housing, electrodes, electret, and fluid are provided for a power generating device according to an embodiment of the present invention.

Next, the method couples the housing onto an entity. In a specific embodiment, the invention provides a biological entity, a mechanical entity, or any combination of these, and the like. Depending upon the embodiment, coupling occurs using implanting, attaching, or other attachment mechanisms, and the like, which that housing can be provided within the entity or worn outside the entity or a combination of these. Alternatively, the housing can have portions or entities that are partially within a body entity and outside of a body entity according to a specific embodiment. Of course, there can be other variations, modifications, and alternatives.

In a specific embodiment, the method generates power (step 507) using the power generating device. In a specific embodiment, the generation of power occurs via movement of the human entity, mechanical entity, or a combination of these, and the like. Depending upon the embodiment, the power can be used for a variety of applications, such as a pace maker, a monitoring device, pain stimulators, neural stimulating devices, internal cardio-verter defibrillator, retinal implant devices, artificial pancreas devices, cochlear implants, limb (e.g., arm, leg, finger, knee) implants (e.g., prosthetics), and others. Of course, one of ordinary skill in the art would recognize other variations, modifications, and alternatives.

In a specific embodiment, the method also stores (step 511) energy derived from the above steps. Depending upon the embodiment, storage can occur through a capacitor structure, a battery, or any combination of these, and the like. In a specific embodiment, the steps are repeated (step 513) to continue store energy for later use in one of a variety of applications. The method stops, at step 515. Of course, there can be other variations, modifications, and alternatives.

Although the above method is illustrated using a selected sequence of steps, it would be recognized that various modifications, alternatives, and variations exist. For example, some of the steps may be combined. Alternatively, some of the steps may be separated. Additional steps may be added before, within, or after any of the steps described above. The method can also provide the sequence of steps in a different manner without departing from the scope of the claims herein. Depending upon the embodiment, further details of the present methods and systems can be found throughout the present specification and more particularly below.

Example of Liquid Power Generator Methods and Devices

To prove the principle and operation of the present invention, we performed experiments. These experiments are merely examples, and should not limit the scope of the claims herein. One of ordinary skill in the art would recognize many variations, alternatives, and modifications. Such experiments used a electret power generator using a liquid working fluid between at least two electrode members according to a specific embodiment. The electret power generator was made using electret materials, such as those noted above, but can be others. Further details of the present power generator can be found throughout the present specification and more particularly below.

In the present example, we present a liquid-rotor electret power generator (LEPG), designed to harvest electricity from low-frequency mechanical vibrations. The device (FIG. 6) includes a fixed-charged, Teflon-electret capacitor with an air-filled gap and a liquid droplet that moves by vibration. As the liquid moves into and out of the gap, a net voltage is generated across the capacitor as image charges (induced by the electret) on the two electrodes redistribute according to the position of the droplet. Experimentally, we have proven the feasibility of such a device and our prototype can generate greater than 30 Vpp open-circuit voltage and deliver a power as high as 0.43 µW to a resistive load (at 28 Hz and $R_{load}$=21 MΩ). The LEPG may be an economical method to harvest power from vibrational environments to power remote sensing devices according to a specific embodiment.

As additional background information, we note that portable and remote electronics often require power, generally provided by disposable or rechargeable batteries. These sources, however, must often be replaced or replenished. Meanwhile, this time the device is not useful. This poses serious problems in placing sensors in remote location devices, such as sensor-net nodes and bio-implantable devices. Improved devices are needed to convert available energy to electrical power. Some solutions include photovoltaic and piezoelectric transducers. S. Roundy, B. Otis, Y-H. Chee, J. Rabaey, P. K. Wright, "A 1.9 GHz Transmit Beacon using Environmentally Scavenged Energy." *ISPLED* 2003, Seoul Korea, Aug. 25-27, 2003 (2003).

In another example, we noted that Seiko has demonstrated the ability to harvest energy from rotational torque with an electromagnetic power generator in the Kinetic™ Series watches. We have demonstrated this same ability with an electrostatic solution, which takes advantage of MEMS process efficiencies and produces output voltage swings greater than 40 volts. Our generator converts rotational energy to electrical energy with a fixed-charge variable-area capacitor. Exploiting the relationship $$V(t)=Q/C(t), C(t)=\epsilon A(t)/d \quad (1)$$

we are able to convert a variable area into a variable voltage for power harvesting.

To take advantage of linear oscillations, we could easily change the geometry of the previous device and fabricate a moving-mass suspended by springs. This is still a fixed-charge, variable-area capacitor. A fixed-charge, variable-distance capacitor is essentially a microphone, which has been previously reported. W. Hsieh, T. Hsu and Y. Tai, "A Micromachined Thin-Film Teflon Electret Microphone", TRANSDUCERS '97, Solid-State Sensors and Actuators, Chicago; Ill., June 1997, IEEE (1997), pp. 2B2.02; W. H. Hsieh, T.-J. Yao and Y.-C. Tai, "A High Performance Mems Thin-Film Teflon Electret Microphone", TRANSDUCERS '99 The 10th International Conference on Solid-State Sensors and Actuators, Sendai, Japan, 1999, Institute of Electrical Engineers of Japan (1999), pp. 1064-1067; and T.-Y. Hsu, W. H. Hsieh, K. Furutani and Y.-C. Tai, "A Thin Film Teflon Electret Technology for Microphone Applications", Technical Digest of the 1996 Solid-State Sensor and Actuator Workshop, Hilton Head Isl., S.C., 1996 June, Transducers Research Foundation, Cleveland (1996), pp. 235-238.

The example presented here explores a variable-permittivity capacitor.

$$C(t)=\epsilon(t)A/d \quad (2)$$

The effects of a variable permittivity are explored in freshman E&M books, D. J. Griffiths, "Introduction to Electrodynamics", Prentice Hall,0-13-481367-7, (1989), but those examples use a solid dielectric. The solid dielectric would quickly destroy the surface made of a material sold as Teflon™ products from Dupont unless a mechanism is employed to maintain a gap while allowing relative motion. This causes more friction and thus consumes valuable energy. Instead of using solids and more processing steps to create micro springs or sliders, our solution exploits the near-zero friction of a high contact angle liquid on the dielectric.

Experiments with liquid water stalled when the liquid experienced electrowetting. H. Moon, S. Cho, R. Garrell and C. Kim, "Low Voltage Electrowetting-on-Dielectric", Journal of Applied Physics, 92, [7], 4080-4087(2002). Using silicone oil to prevent electrowetting would enable the use of water, but it is not clear what effect this would have on the required fixed charge. Mercury is a liquid at room temperature, and does not appear to suffer from electrowetting. It has a contact angle of ~150° on Teflon. Mercury, a conductive metal, is equivalent to a dielectric of infinite permittivity.

With low friction and heavy mass, the mercury remains fixed as we subject the capacitor to linear oscillatory motion.

The LEPG can be described as a displacement current device, in which a constant charge embedded into the Teflon produces an image charge shared between the top and bottom electrodes according to a specific embodiment.

$$Q=q_1(t)+q_2(t)=\sigma LW$$

Where Q is total charge implanted, q1 and q2 represent the free charge available at the electrodes, σ is the measured charge density, and L and W are the length and width of the active channel as can be seen in FIG. 6. By fixing the position of the implanted charge and assuming the charge to be of uniform depth, it acts as a uniform intermediate electrode. The first approximation assumes the charge resides entirely on the surface of the Teflon layer. This intermediate electrode allows us to describe the system as four separate capacitors.

Starting with a single capacitor, C0, we develop an expression for a variable-dielectric capacitor c0' with a dielectric that enters the gap according to the area ratio $\alpha(t)$.

$$C_0 \frac{\varepsilon_0 A_0}{G} \quad (5)$$

$$c'_0 \frac{\varepsilon_0 A_0}{G}(1-\alpha(t)) + \frac{k_{liquid}\varepsilon_0 A_0}{G}\alpha(t) = C_0(1+\chi_{liquid}\alpha(t))$$

Where $X_{liquid}$ is $k_{liquid}-1$

Now, we add in a second capacitor in series to $C_0$ to account for the charge implantation at depth $\Delta$.

$$C_1 = (C_0^{-1} + C_{Teflon}^{-1})^{-1} = \frac{\varepsilon_0 k_{Teflon} A_0}{\Delta + k_{Teflon} G}$$

Incorporating a moving dielectric as shown in FIG. 6b and we get.

$$c_1 = \frac{k_{liquid}\varepsilon_0 A_0 \alpha(t)}{G}, c_2 = \frac{\varepsilon_0 A_0(1-\alpha(t))}{G}, \quad (7)$$

$$c_3 = \frac{k_{Teflon}\varepsilon_0 A_0 \alpha(t)}{\Delta}, c_4 = \frac{k_{Teflon}\varepsilon_0 A_0(1-\alpha(t))}{\Delta}$$

The four capacitors exist between the top electrode and the implanted charge layer and reduce to a single equivalent capacitor as follows $$\left(\frac{1}{c_1}+\frac{1}{c_3}\right)^{-1} = \frac{k_{liquid}k_{Teflon}\varepsilon_0 A_0 \alpha(t)}{k_{liquid}\Delta + k_{Teflon}G}, \quad (8)$$

$$\left(\frac{1}{c_2}+\frac{1}{c_4}\right)^{-1} = \frac{k_{Teflon}\varepsilon_0 A_0(1-\alpha(t))}{\Delta + k_{Teflon}G}$$

Then the equivalent capacitor is expressed as $$c'_1 = \left(\frac{1}{c_1}+\frac{1}{c_3}\right)^{-1} + \left(\frac{1}{c_2}+\frac{1}{c_4}\right)^{-1} = C_1(1+\beta\chi_{liquid}\alpha(t)) \quad (9)$$

Which is similar to equation [5]—a single, variable-dielectric capacitor. The extra term is $$\beta = \frac{k_{Teflon}/\Delta}{k_{liquid}/G + k_{Teflon}/\Delta} \quad (10)$$

For oscillatory motion with the droplet occupying the entire channel at t=0, the area of the channel that is affected by the liquid is described by $$\alpha(t) = \left(\frac{1+\cos(\omega t)}{2}\right) \quad (11)$$

For simplicity we ignore the spherical nature of the droplet. Using the familiar V=Q/C, we can write the loop voltage as $$v_{out} = \frac{q_1}{c'_1} - \frac{q_2}{C_2} = q_1\left(\frac{1}{c'_1} + \frac{1}{C_2}\right) - \frac{Q}{C_2} \qquad (12)$$

Where $q_1$ is the charge on the top electrode, $q_2$ is the charge on the bottom electrode, and $C_2$ is the capacitance between the implanted charge layer and the bottom electrode. $q_2$ was eliminated in favor of the constant charge Q and $q_1$ by substituting [3] into [12].

Noting the obvious, $$v_{out} = iR_l = -R_l\frac{\partial q_1}{\partial t} \qquad (13)$$

and substituting [12] into [13], $v_{out}$ is eliminated:

$$-R_l\frac{\partial q_1}{\partial t} = q_1\left(\frac{1}{c'_1} + \frac{1}{C_2}\right) - \frac{Q}{C_2} \qquad (14)$$

In standard form, this is a linear, first order ODE.

$$\frac{\partial q_1}{\partial t} + \frac{1}{R_{load}}\left(\frac{1}{c'_1} + \frac{1}{C_2}\right)q_1 = \frac{Q}{R_{load}C_2} \qquad (15)$$

Using:

$$m = \frac{1}{R_{load}}\left(\frac{1}{C_1(1+\beta\chi_{liquid}\alpha(t))} + \frac{1}{C_2}\right) \qquad (16)$$

$$n = \frac{Q}{R_{load}C_2}$$

$$\mu(t) = e^{\int mdt} = e^{\frac{t}{R_{load}C_2}}e^{\frac{1}{R_{load}C_1}\int\left(\frac{1}{1+\beta\chi_{liquid}\alpha(t)}\right)dt} \qquad (17)$$

the solution is given by:

$$q_1 = \frac{\int \mu(t)ndt}{\mu(t)} + \frac{Const}{\mu(t)}$$

Numerical methods must be employed to solve this equation. The current, output voltage, and power can then be described as:

$$i = -\frac{\partial q_1}{\partial t}, v_{at} = iR_{load}, P_{out} = i R_{load}^2 \qquad (19)$$

In a specific embodiment, fabrication of the LEPG is shown in FIG. 7. Glass plates with patterned metal are the starting capacitor electrodes. An 8 μm thick Teflon AF is spun onto the bottom plate, and 0.5 μm Teflon onto the top plate T.-Y. Hsu, W. H. Hsieh, K. Furutani and Y.-C. Tai, "A Thin Film Teflon Electret Technology for Microphone Applications", Technical Digest of the 1996 Solid-State Sensor and Actuator Workshop, Hilton Head Isl., S.C., June 1996, Transducers Research Foundation, Cleveland (1996), pp. 235-238. The Teflon AF layer on the bottom plate is then implanted with electrons from a back-lighted thyratron to form the electret. T. Y. Hsu, "A Novel Electron Beam Source Based on the Back-Lighted Thyratron", Ph.D. dissertation, University of Southern California, 1992). The spacer (which also provides the liquid chamber) is made by casting Sylgard 184 PDMS onto a CNC-machined mold (FIG. 8) and bonded to the bottom plate with epoxy. For this demonstration, a liquid mercury droplet is used to partially fill the chamber on the bottom electrode. The top electrode plate is then bonded to the spacer to finish the device (FIG. 9). Cavity dimensions for Device 3 are W=2.3 mm, L=4.812 mm, and H=2.3 mm for a droplet of 50 μL. Cavity dimensions for Device g are W=3.5 mm, L=9.4 mm, H=4.45 mm for a droplet about 600 μL.

Power generation experiments are performed using a shielded box mounted to Labworks Inc. ET-132-2 electrodynamic shaker (FIG. 10), which is driven sinusoidally by a HP33120A function generator through a power amplifier. The acceleration of the power generator is measured using an Endevco256HX-10 accelerometer. Both the acceleration and generator voltage waveforms are averaged over 256 data sets. The shaking frequency is varied from 10 Hz to 60 Hz, while the rms acceleration is kept constant through the experiments. The LEPG is connected to a resistive load and the voltage across the load is measured from a National Semiconductor LF356N op-amp used as a $10^{12}$ Ohm input impedance voltage buffer.

In the present example, power generated versus frequency from two LEPG devices of different size suggests that device geometry can be optimized for shaking parameters (FIG. 11). In this graph we see the maximum power of 0.25 μW was produced with Device 3, the same shown in FIG. 9. The waveform of Device 3 appears to be frequency shifted by 19 Hz with respect to Device g, with secondary peaks being larger in magnitude. The frequency shift is expected since channel length for Device g is ~50% longer than Device 3. The measured masses are: Device 3 is 2.7 g and Device g is 5 g, including mercury.

FIG. 12 also shows that for a single device, power generation versus frequency is load dependent. The figure shows that power is scaled, but not translated in frequency for different loads. Thus far, insufficient testing precludes determining the optimum load according to the present example of the invention.

FIG. 13 shows open circuit voltage increasing with acceleration up to 16 Hz for a single device. From 16 Hz to 24 Hz the voltage output exceeds the buffer amplifier range of 30 Vpp. For frequencies greater than 24 Hz the mercury droplet begins to oscillate in multiple modes at frequencies other than the driving frequency. This lowers rms voltage output. The shaker setup does exhibit slight resonant modes in the y and z axes, however, this phenomenon is observed on all test samples, and appears to be related to cavity and/or liquid dimensions as shown in FIG. 11.

The voltage response of FIG. 14 is clipped, but it is apparent that system response is related to the driving function. The driving function being fed to the shaker is sinusoidal, but this frequency is below the specifications listed on the accelerometer. Watching the shaker, the motion is visibly not sinusoidal. As acceleration passes through its maximum, the voltage output passes through zero. Equivalently, current is proportional to velocity.

Lifetime tests were performed on Device g. The test consisted of a repeating, linear frequency sweep between 1 and 60 Hz over 30 second intervals for 2 weeks. There was no noticeable change in the output power or waveform over this time.

In a specific embodiment, we have produced a variable-permittivity power generator with maximum power output of 0.25 μW and over 30 Vpp open circuit voltage. The trend shows an increase in power generated for smaller devices and higher frequencies. For load resistances tested, there is no evidence that maximum power output shifts in frequency with load resistance. Further work should probe the effects of scaling device dimensions and varying liquid volume fractions. Liquid dielectrics with dielectric constant less than infinity should also be explored. Further details of the present embodiment and other aspects of the invention can be found throughout the present specification and more particularly below.

Example of Arrayed Liquid Power Generator Methods and Devices

We have previously described how to use liquid dielectric in an electret capacitor to generate electricity from mechanical motions according to a specific embodiment. To increase power output, we are combining multiple devices on a single chip in parallel or in series. Constructing multiple devices in parallel increases the current output from the device and thus increases the power output. Similarly, constructing multiple devices in series increases the voltage output of the device, thus increasing the power output. Furthermore, we can construct some devices in parallel and some in series in the same package, which increases both the current and voltage output of the conglomerate device. So far, we are speaking of a two dimensional array of devices, but more power can be generated from stacking these channels in three dimensions with devices in parallel, series, or some combination of both. Further details of the present embodiment using multiple devices is found throughout the present specification and more particularly below.

FIG. 15 is a simplified diagram of an arrayed electret generator device according to an embodiment of the present invention. This diagram is merely an example, which should not unduly limit the scope of the claims herein. One of ordinary skill in the art would recognize many variations, modifications, and alternatives. As shown, the arrayed device has 18 channels in parallel with electrodes on both sides of the channel to harvest energy from the full motion of the liquid dielectric in the channel. Further details of the present device can be found throughout the present specification and more particularly below.

In the present example, we have provided serial and parallel arrays of LEPG power generators to increase power output according to a specific embodiment. Power output from parallel arrays scales linearly with number of devices, as expected, to produce power output up to about 10 μW. Of course, there can be other modifications, alternatives, and variations.

As additional background information, we noted a proliferation of remotely placed sensors, actuators, and electronics and a need for self-sustaining power sources. Specific examples, such as sensor-net nodes and bio-implantable devices, illustrate the difficulties of replacing batteries and the utility of a power source that never needs to be replaced. Energy harvesting, or power scavenging, entails transforming ambient energy into electrical energy. Much work has been dedicated to converting kinetic, light, and heat energy into useable power. The LEPG [J. S. Boland and Y.-C. Tai, "Liquid-Rotor Electret Micropower Generator," presented at Solid-State Sensor, Actuator, and Microsystems Workshop, Hilton Head Island, S.C., 2004] is the latest energy harvesting device that transforms kinetic energy into electrical energy.

In the present example, we model the top and bottom electrodes on the left half of the channel shown in FIG. 16. We assume a simple capacitive structure and define:

$$C_1(t) = \frac{\varepsilon_{Liquid} \cdot A \cdot x(t)}{G}, \quad C_2(t) = \frac{\varepsilon_{teflon} \cdot A \cdot x(t)}{D} \quad (1.4)$$

$$C_3(t) = \frac{\varepsilon_0 \cdot A \cdot (1-s(t))}{G}, \quad C_4(t) = \frac{\varepsilon_{teflon} \cdot A \cdot (1-x(t))}{D}$$

corresponding with FIG. 17, and use x(t) as a unitless quantity to describe the relative motion of the capacitors to the liquid.

Assuming sinusoidal motion of amplitude $X_0$ and frequency ω, we have $$x(t) = X_0 \cos(\omega t) \quad (1.5)$$

We use Kirchoff's Voltage Law $$V = \frac{Q_1}{C_1} - \frac{Q_2}{C_2} = \frac{Q_3}{C_3} - \frac{Q_4}{C_4} \quad (1.6)$$

with $Q_1, Q_2, Q_3,$ and $Q_4$ corresponding to the charge stored on respective capacitors. With implanted charge ρ and capacitor area A, charge conservation give us $$Q_1 + Q_2 = \rho \cdot A \cdot x(t),$$

$$Q_3 + Q_4 = \rho \cdot A \cdot (1 - x(t)) \quad (1.7)$$

It follows:

$$Q_2 = \frac{-V + \rho A x(t) \frac{1}{C_1}}{\frac{1}{C_1} + \frac{1}{C_2}} \quad (1.8)$$

$$Q_4 = \frac{-V + \rho A (1 - x(t)) \frac{1}{C_3}}{\frac{1}{C_3} + \frac{1}{C_4}} \quad (1.9)$$

By Kirchoff's Current Law:

$$-\frac{V}{R} + \frac{dQ_2}{dt} + \frac{dQ_4}{dt} = 0 \quad (1.10)$$

We can then take derivatives of (1.8) and (1.9) and substitute them into (1.10). After simplifying, we arrive at an intractable linear first order ODE.

$$V' = \quad (1.11)$$

$$\left\{ \frac{1}{\frac{C_1 C_2}{C_1 + C_2} + \frac{C_3 C_4}{C_3 + C_4}} \right\} \cdot \left\{ \begin{array}{l} -\left[\frac{1}{R} + \left(\frac{C_1 C_2}{C_1 + C_2} + \frac{C_3 C_4}{C_3 + C_4}\right)'\right] \cdot V \\ + \left[\left(\frac{C_2}{C_1 + C_2}\right) - \left(\frac{C_4}{C_3 + C_4}\right)\right] \cdot \rho A x' \end{array} \right\}$$

It can be easily verified that equation (1.11) reduces to the well-known RC tank circuit when the capacitors are held constant. Specific details of methods and systems of the multi-device configuration can be found throughout the present specification and more particularly below.

In a specific embodiment, we have fabricated the present device using certain materials and processes. As an example, glass plates are patterned with metal to form capacitor electrodes (FIG. 18). A 25 µm thick film of Teflon FEP is glued to the bottom plate using Teflon AF, which does not provide good adhesion. A 0.5 µm Teflon AF thin film is spun on the top plate to protect the top electrodes from the mercury. The Teflon PTFE layer on the bottom plate is then implanted with electrons from a Welty handheld ion generator to form the electret. The surface voltage was measured to be −850 V before the power generation trials. The spacer (which also defines the liquid chamber) is made by casting Sylgard 184 PDMS onto a CNC-machined mold. Either liquid mercury droplets or a aggregate of steel beads [J. S. Boland, J. D. M. Messenger, and Y.-C. Tai, "Alternative Designs of Liquid Rotor Electret Power Generator Systems," presented at The Fourth International Workshop on Micro and Nanotechnology for Power Generation and Energy Conversion Applications, Kyoto, Japan, 2004] is used to fill half the chamber on the bottom electrode plate. The top electrode plate is then placed on the spacer to finish the device (FIG. 18). Cavity dimensions are W=1 mm, L=2 mm, and H=1 mm with a droplet volume of 1 µL, with 3 columns of 6 cavities per die. Of course, there can be other variations, modifications, and alternatives.

Power generation experiments are performed on a Labworks Inc. ET-139 electrodynamic shaker (FIG. 19) driven sinusoidally by a HP33120A function generator through a Labworks Inc. PA-141 power amplifier. Acceleration is measured using an Endevco 256HX-10 accelerometer according to a specific embodiment of the present invention. Displacement is acquired by double integration of the acceleration waveform. The shaking frequency can be varied from 20 to 100 Hz, and the displacement can be varied from 0 to 5 mm peak-to-peak. The LEPG's output voltage across a load resistor is measured with a National Semiconductor LF356N op-amp used as a $10^{12}$ Ohm impedance voltage buffer. Both acceleration and generator voltage waveforms are averaged over 256 samples on an HP (Hewlett Packard) oscilloscope and captured to computer by IntuiLink software from HP over GPIB, which is common communication standard for test equipment.

In the present example, we have achieved certain results according to an embodiment of the present invention. With the top electrodes replaced by a glass slide, using high-speed video we can clearly see the motion of the channels and the mercury droplets within. Shaking at low amplitudes and above 20 Hz with the channels perpendicular to gravity, the mercury droplets remain fixed in space while the channels move about them. By increasing the amplitude to at least half the channel length, we see that the droplets' centers of mass are well synchronized but no longer stationary. Impacts with the ends of the cavities impart energy to the mercury droplets that is converted into deformation of the surface (as shown in FIG. 20.). When the walls and the droplets have zero relative velocity, the energy of surface deformation is transferred back into kinetic energy of the droplets. This process increases the relative motion of the droplets, and is reflected in the output waveforms as phase lag (FIG. 23.) and larger currents with reduced duty cycle. The increase in power output in this overdriving mode is smaller than the increase in input energy. While overdriving the amplitude ensures synchronization, it is rarely the case that the channels are perfectly perpendicular to gravity, and overdriving may be unnecessary. Replacing the mercury with aggregates of steel beads demonstrates no phase lag and also benefits from overdriving [J. S. Boland, J. D. M. Messenger, and Y.-C. Tai, "Alternative Designs of Liquid Rotor Electret Power Generator Systems," presented at The Fourth International Workshop on Micro and Nanotechnology for Power Generation and Energy Conversion Applications, Kyoto, Japan, 2004].

By design, the arrayed devices are organized in 3 columns, where every column contains 6 devices in parallel (FIGS. 16 and 17) according to a specific embodiment. Each device in the array contains an electrode pair on each half of the channel. For the purposes of this test, only the electrodes on the left side of the channels are tested. We take data from 1, 2, or 3 columns in parallel (FIG. 21). Data shows power output scaling linearly with number of devices in parallel. Testing smaller arrays with 4 and 5 devices per column produced similar results.

After tests demonstrated the linear scaling of parallel arrays, we used the same columns of 6 electrodes, but this time the electrodes between the columns were connected serially. The relationship is anything but linear in this case, and any columns in serial produce less power output than single columns. The waveforms are shown in FIG. 22, which shows voltage vs. time for each column and combinations of those columns. These results imply complicated interactions between columns, probably related to slight phase differences and feedback effects. Testing with 4 and 5 electrode columns produced similar results.

This example demonstrated the ability to connect many LEPG devices in parallel, and the difficulty with serially connected LEPG devices according to a specific embodiment. Devices in parallel allow for increased power output, and also allow for the possibility of creating further miniaturized and embedded power systems. Additional details of the present invention can be found throughout the present specification and more particularly below.

In a specific embodiment, we have previously described above how to use liquid dielectric in an electret capacitor to generate electricity from mechanical motions. It is clear from our experiments that an insulator with low dielectric constant is necessary to reduce stray capacitance of the liquid-rotor electrostatic power generator according to an embodiment of the present invention. We have shown that silicone rubber, Sylgard 184 and equivalent, is a good choice because it is easy to mold into the channel shape and it has a low dielectric constant and is a good insulator. Other choices of material can include acrylic and other moldable or machinable plastics, photopatternable silicone rubber, fluorosilicone rubber, SU-8 and other photoresists, and various types of glass.

In addition to reducing stray capacitance, rubber provides an easy means of sealing the channel to prevent leakage. Or, using a photo patternable material such as SU-8 or photo patternable silicone rubber allows at least one sided of the device to be sealed while the spacer/channel material is in liquid form, which prevents any leaks at that interface after the spacer dries.

Figure 24:
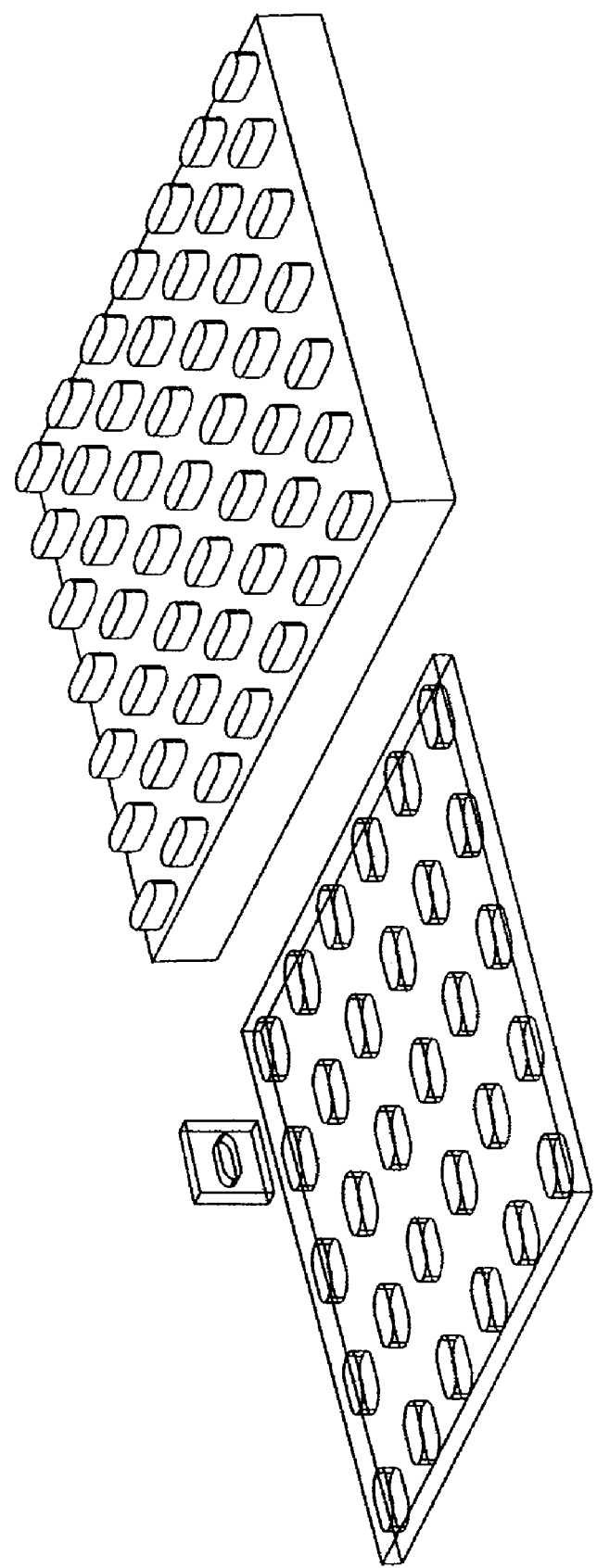

As merely an example, FIG. 24 illustrates a cast silicone rubber and the aluminum mold negative used to produce it. This diagram is merely an examples, which should not unduly limit the scope of the claims herein. One of ordinary skill in the art would recognize many variations, modifications, and alternatives.

Alternative Example of Liquid Power Generator Methods and Devices

We have previously described how to use liquid dielectric in an electret capacitor to generate electricity from mechanical motions according to embodiments of the present invention. We determined that liquid mercury is a good liquid to use to change the permittivity of the electret capacitor in a specific embodiment. Other liquid materials such as mercury can also be used. Along similar lines, we demonstrate that solid metal beads are also a good material to use according to other embodiments. Single beads can be used in a channel in a specific embodiment. In alternative embodiments, the present method and devices uses multiple beads in the same channel to approximate a liquid metal. In this sense, this is still a liquid dielectric electrostatic power generator or "acts" as a liquid dielectric material according to a specific embodiment. Of course, there can be other variations, modifications, and alternatives. These beads can also be made of any dielectric material, such as Teflon beads or silica beads, so long as the beads change the permittivity of the electret capacitor. Furthermore, these beads can and should be coated with a soft material, such as a fluoro-polymer or a silicone, to reduce wear on the channel. Similarly, the beads can be solid, a layered material or even hollow beads. Beads with pores can also be used.

These beads can also be suspended in a fluid medium to reduce wear, and in this sense we also claim use of a liquid-solid dielectric for electrostatic power generation.

Figure 25:
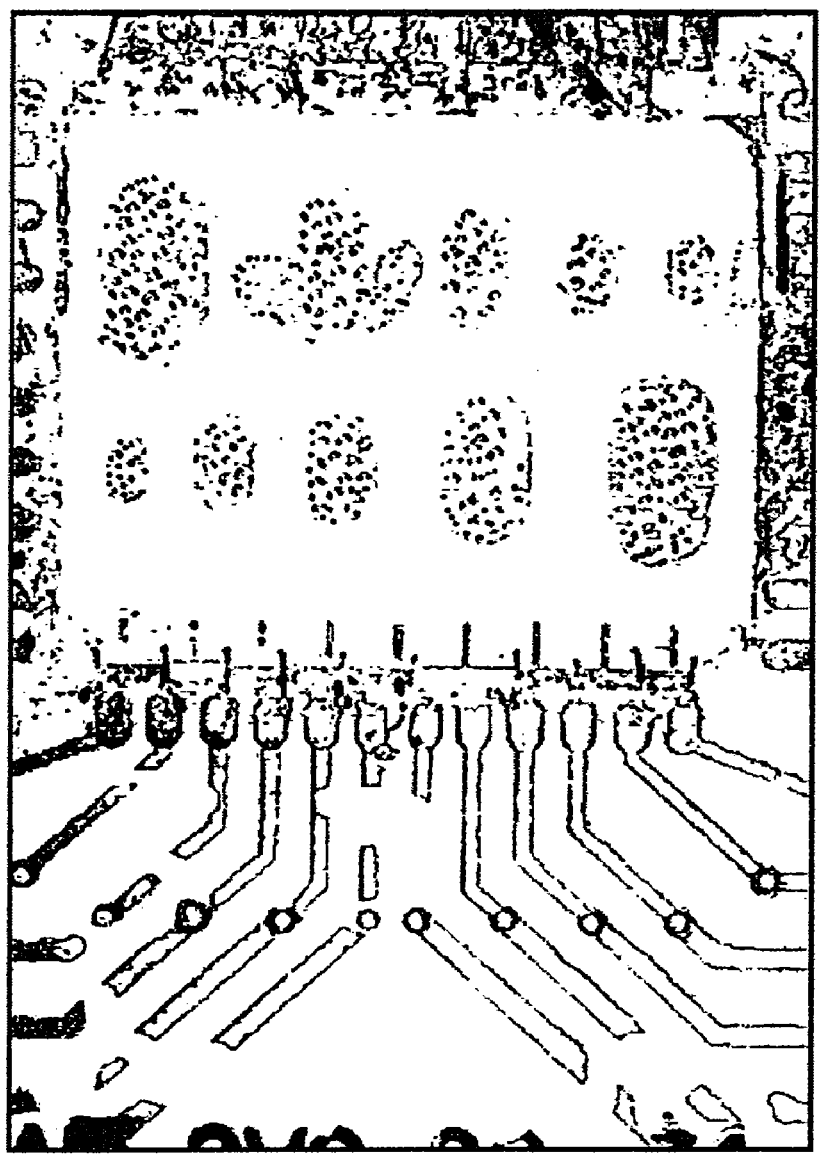
Figure 26:
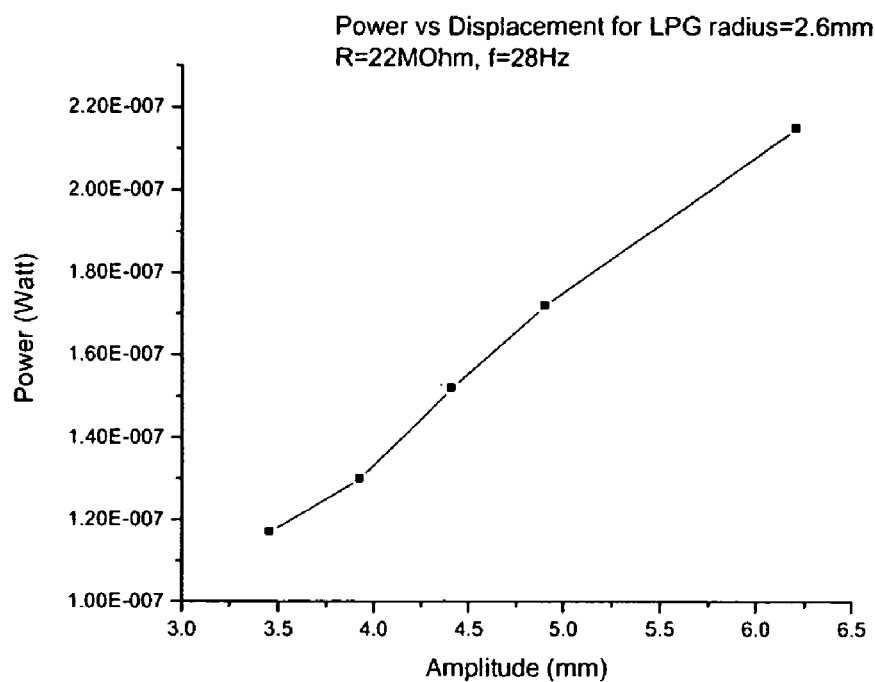
Figure 27:
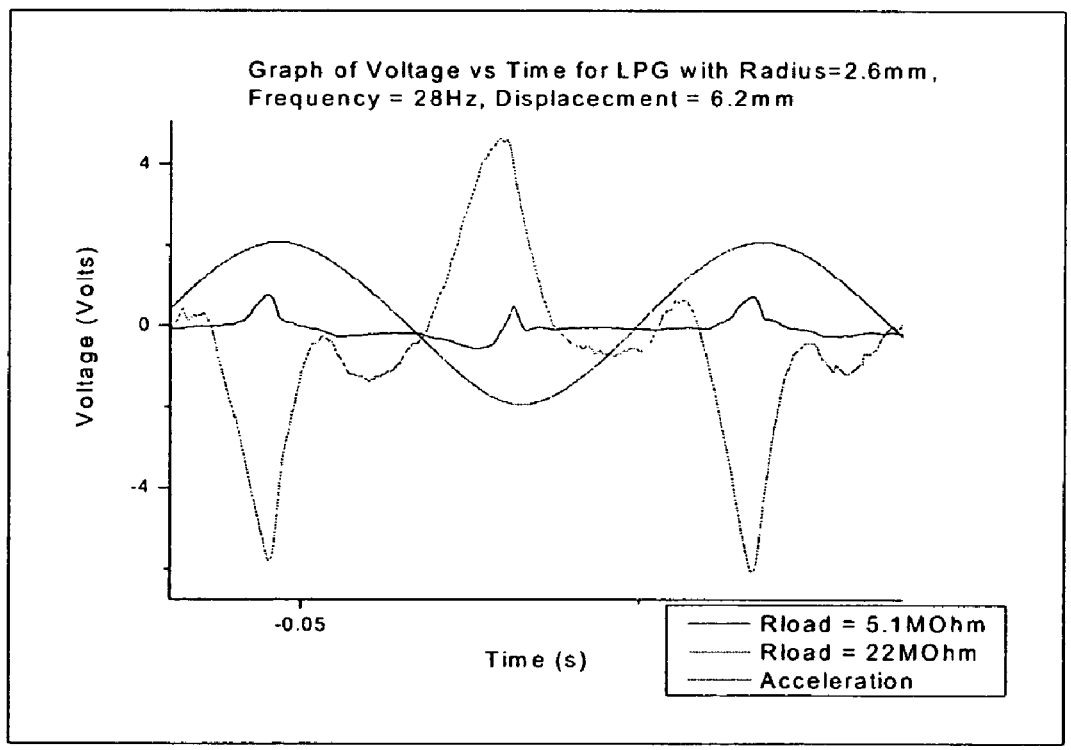

Referring to FIG. 25, we demonstrated five (5) different sized channels half-filled with steel beads as a dielectric according to a specific embodiment. FIG. (top right) 26 shows power generated from one of these channels according to an alternative embodiment. As shown, power in Watts is illustrated on the vertical axis, and displacement for the LPG has been illustrated on the horizontal axis. FIG. (bottom right) 27 shows power generated from one of these channels versus time at two different shaking amplitudes with acceleration of the device shown in blue. Here, voltage has been plotted against time, which is on the horizontal axis. Of course, these diagrams are merely illustrations and should not unduly limit the scope of the claims herein. One of ordinary skill in the art would recognize many variations, modifications, and alternatives. Further details of the present method and device can be found throughout the present specification and more particularly below.

We provide other liquid-rotor electret power generators (LEPG) [J. S. Boland and Y.-C. Tai, "Liquid-Rotor Electret Micropower Generator," presented at Solid-State Sensor, Actuator, and Microsystems Workshop, Hilton Head Island, S.C., 2004] in which we use a conglomeration of steel beads as an approximate liquid and power output measurements from different electrode configurations. LEPG devices are essentially fixed-charged, Teflon-electret capacitors with air-filled gaps and liquid droplets that move by vibration. As the liquid moves into and out of the gaps, a net voltage is generated across the capacitor as image charges on the electrodes redistribute according to the position of the droplets. High-speed video of beads in channels demonstrates a liquid-like behavior. Furthermore, we discovered that certain electrode connections yield more power output according to a specific embodiment. An importance of this new work is in demonstrating that using many steel beads in a channel is a viable alternative to mercury and that different electrode combinations yield larger power than the original design.

In a specific embodiment, we fabricated the LEPG using certain materials and methods. Fabrication of the LEPG is shown in FIG. 28. Glass plates with patterned metal are the starting capacitor electrodes. A 125 μm thick film of Teflon PTFE is glued to the bottom plate using Teflon AF, which does not provide good adhesion. A 0.5 μm Teflon AF thin film is spun on the top plate to protect the top electrodes from the mercury. The Teflon PTFE layer on the bottom plate is then implanted with electrons from a Welty handheld ion generator to form the electret. The surface voltage was measured to be −950V after the power generation trials were completed. The spacer (which also defines the liquid chamber) is made by casting Sylgard 184 PDMS onto a CNC-machined mold (FIG. 29). Either a liquid mercury droplet or a conglomeration of steel beads is used to fill half the chamber on the bottom electrode plate. The top electrode plate is then placed on the spacer to finish the device (FIG. 30). Cavity dimensions are W=2.6 mm, L=5.2 mm, and H=2.6 mm with a droplet volume of 20 μL.

In a specific embodiment, certain experimental data have been provided. Power generation experiments are performed on a Labworks Inc. ET-139 electrodynamic shaker driven sinusoidally by a HP33120A function generator through a Labworks Inc. PA-141 power amplifier. Acceleration is measured using an Endevco 256HX-10 accelerometer. Displacement is acquired by double integration of the acceleration waveform. The shaking frequency can be varied from 20 Hz to 100 Hz, and the displacement can be varied from 0 to 5 mm peak-to-peak. The LEPG's output voltage across a load resistor is measured with a National Semiconductor LF356N op-amp used as a $10^{12}$ Ohm impedance voltage buffer. Both acceleration and generator voltage waveforms are averaged over 256 samples on an HP oscilloscope and captured to computer by IntuiLink software over GPIB.

From high speed video we see that mercury has phase lag relative to the driving motion due to collisions with the wall, which transfer energy into surface tension and then back to kinetic energy. However, steel beads maintain a center of mass which is fixed in space while the chamber moves about them. This implies a lack of effective surface friction between the beads and the chamber. The beads' motion can be described without use of surface tension terms, which is advantageous at high accelerations where the impact energy is sufficient to create new surfaces on the mercury. Using mercury or steel beads provides comparable power for low accelerations as seen in FIGS. 31 and 32.

Power output from beads and from mercury exhibits interesting features according to a specific embodiment. The power output from the beads appears to scale linearly with frequency for the range tested. The power is dramatically improved with increasing resistance, from 13 nW at 5.1 MΩ to 220 nW at 22 MΩ, which implies that 22 MΩ is approaching a load-matched situation. The power change over the same 2 resistances for the mercury case is 10 nW to 18 nW, which implies that the load resistance is far from optimal in this case.

Different combinations of connections between electrodes on the LEPG devices were tested according to a specific embodiment. Power output was, on average, lowest when the top and bottom electrodes directly across from each other were tested. The highest power was obtained when there were three resistors connected at the same time, most likely related to charge flow between all 4 electrodes.

Careful examination of FIG. 33 reveals that the V1-V2 and V3-V4 signals are inverted and reversed in time. The V3-V2 signal is the largest signal and perhaps the most useful for power generation because of its near sinusoidal nature and larger voltage. However, FIG. 34 shows that the V3-V2 signal is less significant if charge is not allowed to flow around the entire system when the V1-V2 and V3-V4 resistors are removed.

Our improved LEPG has been promising, economical method to harvest power from vibrational environments to power remote sensing devices. Steel beads can approximate a fluid and produce more power than mercury. In other embodiments, the beads may be coated with parylene or other soft polymers to prevent the beads from wearing the channels. Of course, there can be other variations, modifications, and alternatives.

Although the above has been shown in specific embodiments and/or examples, it would be appreciated that various modifications, alternatives, and variations may exist. For example, depending upon the embodiment, the methods and devices may have different connection configurations. Additionally, various electrode designs may also be provided according to other embodiments. Furthermore, since two, coplanar electrodes generated the most power, it may be possible to reduce the number of electrodes and produce a simpler device according to other embodiments. Additionally, the liquid tested in certain embodiments is mercury, other liquid metals can also be used. Additionally, the liquid may also include one or more solid entities, such as steel balls and/or beads, or other solid entities that behave similar to a fluid entity according to other embodiments. Of course, there can be other variations, modifications, and alternatives.

The above example is merely an illustration, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for generating power, the system comprising:
    a first electrode member comprising a first region;
    a second electrode member comprising a second region, the second electrode member being coupled to the first electrode member;
    an electret coupled between the first electrode member and the second electrode member;
    a spatial region provided between the first region of the first electrode member and the second region of the second electrode member;
    a volume of fluid adapted to move between the first region and the second region to cause a change in an electric field characteristic within a portion of the spatial region by the movement of at least a portion of the fluid within the portion of the spatial region to generate a change in voltage potential between the first electrode and the second electrode.

2. The system of claim 1 wherein the portion of the spatial region is an entirety of the spatial region.

3. The system of claim 1 wherein the spatial region is fixed in size.

4. The system of claim 1 wherein the volume of fluid is less than a volume of the spatial region.

5. The system of claim 1 wherein the change in voltage is associated with an alternating voltage.

6. The system of claim 1 wherein the volume of fluid is continuous.

7. The system of claim 1 wherein the volume of fluid moves in and out of a region between the first region and the second region.

8. The system of claim 1 wherein the volume of fluid moves through a region between the first region and the second region.

9. The system of claim 1 wherein the volume of fluid comprises a plurality of solid entities.

10. The system of claim 1 wherein the volume of fluid comprises a plurality of solid entities, the plurality of solid entities being adapted to behave as a fluid entity.

11. The system of claim 1 wherein the spatial region comprises a gas portion, the gas portion being capable of displacement by a portion of the volume of the fluid.

12. The system of claim 1 wherein the spatial region is a spatial volume.

13. The system of claim 1 wherein the first electrode member comprises at least a conductive element.

14. The system of claim 1 wherein the second electrode member comprises at least a conductive element.

15. The system of claim 1 wherein the volume of fluid comprises a liquid.

16. The system of claim 1 wherein the volume of fluid comprises a vapor.

17. The system of claim 1 wherein the volume of fluid comprises a conductive characteristic.

18. The system of claim 1 wherein the volume of fluid is a substantially metal fluid.

19. The system of claim 1 wherein the volume fluid is a single continuous metal entity, the metal entity being a liquid metal.

20. The system of claim 1 wherein the spatial region comprises a plurality of cell regions, each of the cell regions being characterized by a cell spatial volume.

21. The system of claim 1 wherein the volume of fluid comprises a plurality of solid entities, each of the solid entities being capable of movement through a portion of the spatial region.

22. The system of claim 1 wherein the volume of fluid comprises a one or more entities of a higher density than a fluid density of the fluid, the one or more entities being capable of movement through a portion of the spatial region.

23. The system of claim 1 wherein the electret comprises a high resistance polymer bearing material.

24. The system of claim 1 wherein the electric comprises a high resistance polymer bearing material, the high resistance polymer material being a material called Teflon TM manufactured by Dupont.

25. The system of claim 1 wherein the electret comprises a high resistance oxide bearing material.

26. The system of claim 1 wherein the electret comprises a high resistance oxide bearing material, the high resistance oxide being material comprising a silicon dioxide.

27. The system of claim 1 wherein the electret comprises a single material.

28. The system of claim 1 wherein the electret comprises two or more layers of materials.

29. The system of claim 1 wherein the electret comprises a plurality of cavities therein.

30. The system of claim 1 wherein the electret comprises a plurality of cavities therein, each of the cavities being a void region, the cavities being provided in a solid foam material.

31. The system of claim 1 wherein the electret is characterized by a micromachining process.

32. A method for generating power, the method comprising:
    providing a volume of fluid within a spatial region provided between a first region of a first electrode member and a second region of a second electrode member, the first region and the second region having an electret material coupled between the first region and the second region;

moving at least a portion of the volume of fluid within a portion of the spatial region between the first region and the second region to cause a change in an electric field characteristic within the portion of the spatial region by at least the movement of at least the portion of the fluid; and generating a change in voltage potential between the first electrode and the second electrode from at least the change in the electric field characteristic caused by at least the movement of at least the portion of the fluid.

33. The method of claim 32 wherein the portion of the spatial region is an entirety of the spatial region.

34. The method of claim 32 wherein the spatial region is fixed in size.

35. The method of claim 32 wherein the volume of fluid is less than a volume of the spatial region.

36. The method of claim 32 wherein the change in voltage is associated with an alternating voltage.

37. The method of claim 32 wherein the volume of fluid is continuous.

38. The method of claim 32 wherein the volume of fluid moves in and out of a region between the first region and the second region.

39. The method of claim 32 wherein the volume of fluid moves through a region between the first region and the second region.

40. The method of claim 32 wherein the volume of fluid comprises a plurality of solid entities.

41. The method of claim 32 wherein the volume of fluid comprises a plurality of solid entities, the plurality of solid entities being adapted to behave as a fluid entity.

42. The method of claim 32 wherein the spatial region comprises a gas portion, the gas portion being capable of displacement by a portion of the volume of the fluid.

43. The method of claim 32 wherein the spatial region is a spatial volume.

44. A system for generating power using a liquid dielectric material coupled to an electret, the system comprising:
a first electrode member, comprising a first surface region;
a second electrode member comprising a second surface region, the second electrode member being coupled to the first electrode member;
an electret coupled between the first electrode member and the second electrode member;
a spatial volume provided between the first surface region of the first electrode member and the second surface region of the second electrode member;
a fluid capable of movement within the spatial volume between the first surface region and the second surface region, the movement of a portion of the fluid causing a change in an electric field characteristic within a portion of the spatial volume.

45. The system of claim 44 wherein the first electrode member comprises at least one homogeneous conductive element.

46. The system of claim 44 wherein the second electrode member comprises at least one homogeneous conductive element.

47. The system of claim 44 wherein the fluid comprises a liquid.

48. The system of claim 44 wherein the fluid comprises a vapor.

49. The system of claim 44 wherein the fluid comprises a conductive characteristic.

50. The system of claim 44 wherein the fluid is a substantially metal fluid.

51. The system of claim 44 wherein the fluid is a single continuous metal entity, the metal entity being a liquid metal.

52. The system of claim 44 wherein the spatial volume comprises a plurality of cell regions, each of the cell regions being characterized by a cell spatial volume.

53. The system of claim 44 wherein the fluid contains a plurality of solid entities within a portion of a volume of the fluid, each of the solid entities being capable of movement through a portion of the spatial volume.

54. The system of claim 44 wherein the fluid comprises a one or more entities of a higher density than a fluid density of the fluid, the one or more entities being capable of movement through a portion of the spatial volume.

55. The system of claim 44 wherein the electret comprises a high resistance polymer bearing material.

56. The system of claim 55 wherein the high resistance polymer bearing material is a material called Teflon™ manufactured by Dupont.

57. The system of claim 44 wherein the electret comprises a high resistance oxide bearing material.

58. The system of claim 57 the high resistance oxide bearing material comprise silicon dioxide.

59. The system of claim 44 wherein the electret comprises a single material.

60. The system of claim 44 wherein the electret comprises two or more layers of materials.

61. The system of claim 44 wherein the electret comprises a plurality of cavities therein.

62. The system of claim 44 wherein the electret comprises a plurality of cavities therein, each of the cavities being a void region, the cavities being provided in a solid foam material.

63. The system of claim 44 wherein the electret is characterized by a micromachining process.

64. A system for generating power, the system comprising a plurality of power generating devices, each of the power generating devices comprising:
a first electrode member comprising a first region;
a second electrode member comprising a second region, the second electrode member being coupled to the first electrode member;
an electret coupled between the first electrode member and the second electrode member;
a spatial region provided between the first region of the first electrode member and the second region of the second electrode member;
a volume of fluid adapted to move between the first region and the second region to cause a change in an electric field characteristic within a portion of the spatial region by the movement of at least a portion of the fluid within the portion of the spatial region to generate a change in voltage potential between the first electrode and the second electrode.

65. The system of claim 64 wherein the portion of the spatial region is an entirety of the spatial region.

66. The system of claim 64 wherein the spatial region is fixed in size.

67. The system of claim 64 wherein the volume of fluid is less than a volume of the spatial region.

68. The system of claim 64 wherein the change in voltage is Associated with an alternating voltage.

69. The system of claim 64 wherein the volume of fluid is continuous.

70. The system of claim 64 wherein the volume of fluid moves in and out of a region between the first region and the second region.

71. The system of claim 64 wherein the volume of fluid moves through a region between the first region and the second region.

72. The system of claim 64 wherein the volume of fluid comprises a plurality of solid entities.

73. The system of claim 64 wherein the volume of fluid comprises a plurality of solid entities, the plurality of solid entities being adapted to behave as a fluid entity.

74. The system of claim 64 wherein the spatial region comprises a gas portion, the gas portion being capable of displacement by a portion of the volume of the fluid.

75. The system of claim 64 wherein the spatial region is a spatial volume.

76. The system of claim 64 wherein the plurality of devices are arranged in an array configuration, the array configuration comprising a plurality of rows numbered from 1 through N, and a plurality of columns numbered from 1 through M.

77. The system of claim 64 wherein the plurality of devices are arranged in a three dimensional array configuration, the array configuration comprising a plurality of rows numbered from 1 through N, a plurality of columns numbered from 1 through M, each of the rows and each of the columns occupying at least one of a plurality of layers numbered from 1 through Z, whereupon Z is an integer of two and greater.

78. The system of claim 64 wherein each of the devices is configured in parallel electrical arrangement with any one of the other devices.

79. The system of claim 64 wherein each of the devices is configured in a serial electrical arrangement with any one of the other devices.

* * * * *